United States Patent
Spivack et al.

(10) Patent No.: US 8,762,302 B1
(45) Date of Patent: Jun. 24, 2014

(54) SYSTEM AND METHOD FOR REVEALING CORRELATIONS BETWEEN DATA STREAMS

(71) Applicant: Bottlenose, Inc., Sherman Oaks, CA (US)

(72) Inventors: Nova Spivack, Sherman Oaks, CA (US); Dominiek ter Heide, Amsterdam (NL); Seyed Ali Mousavi, Diamond Bar, CA (US)

(73) Assignee: Bottlenose, Inc., Sherman Oaks, CA (US)

( * ) Notice: Subject to any disclaimer, the term of this patent is extended or adjusted under 35 U.S.C. 154(b) by 0 days.

(21) Appl. No.: 14/185,809

(22) Filed: Feb. 20, 2014

Related U.S. Application Data

(60) Provisional application No. 61/768,351, filed on Feb. 22, 2013.

(51) Int. Cl.
 *G06F 15/18* (2006.01)
 *G06N 99/00* (2010.01)
 *G06N 5/02* (2006.01)

(52) U.S. Cl.
 CPC ............... *G06N 5/02* (2013.01); *G06N 99/005* (2013.01)
 USPC .......................................................... 706/12

(58) Field of Classification Search
 CPC .... G06N 5/025; G06K 9/00536; G10L 15/00; G06F 3/0484
 See application file for complete search history.

(56) References Cited

U.S. PATENT DOCUMENTS

| | | | |
|---|---|---|---|
| 6,373,483 | B1 | 4/2002 | Becker et al. |
| 8,073,850 | B1 | 12/2011 | Hubbard et al. |
| 2002/0082923 | A1 | 6/2002 | Merriman et al. |
| 2005/0114786 | A1 | 5/2005 | Decombe |
| 2006/0173957 | A1 | 8/2006 | Robinson et al. |
| 2006/0282328 | A1 | 12/2006 | Gerace et al. |
| 2007/0174057 | A1 | 7/2007 | Genly |
| 2008/0177813 | A1 * | 7/2008 | Wang et al. ............ 708/422 |
| 2008/0275861 | A1 | 11/2008 | Baluja et al. |
| 2009/0037521 | A1 | 2/2009 | Zilca et al. |

(Continued)

FOREIGN PATENT DOCUMENTS

| | | |
|---|---|---|
| JP | 2006227965 A | 8/2006 |
| KR | 20090074108 A | 7/2009 |
| WO | WO-2009007754 A1 | 1/2009 |
| WO | WO-2009035618 A2 | 3/2009 |

OTHER PUBLICATIONS

Brdiczka et al. "Automatic Detection of Interaction Groups", ICMI, 2005, pp. 5.*

(Continued)

*Primary Examiner* — Li-Wu Chang

(74) *Attorney, Agent, or Firm* — Perkins Coie LLP

(57) ABSTRACT

The disclosed techniques can provide users with a tool having an integrated, user-friendly interface and having automated mechanisms which can reveal correlations between data streams to the users in a clear and easily understandable way, thereby enabling the users to easily digest the vast amount of information contained in activities within one or more network, to understand the correlations among the activities, to stay informed and responsive to current or new trends, and even to predict future trends. Among other benefits, the disclosed techniques are especially useful in the context of discovering impacts of social networking activities on other types of commercial activities.

28 Claims, 26 Drawing Sheets

(56) References Cited

U.S. PATENT DOCUMENTS

| | | | |
|---|---|---|---|
| 2009/0327275 | A1 | 12/2009 | Walker et al. |
| 2010/0030648 | A1 | 2/2010 | Manolescu et al. |
| 2010/0042944 | A1 | 2/2010 | Robinson et al. |
| 2010/0049852 | A1 | 2/2010 | Whitnah et al. |
| 2010/0083124 | A1 | 4/2010 | Druzgalski et al. |
| 2010/0100537 | A1 | 4/2010 | Druzgalski et al. |
| 2010/0114946 | A1 | 5/2010 | Kumar et al. |
| 2010/0119053 | A1 | 5/2010 | Goeldi |
| 2010/0121707 | A1 | 5/2010 | Goeldi |
| 2010/0281041 | A1 | 11/2010 | Almeida |
| 2010/0306049 | A1 | 12/2010 | Kakade et al. |
| 2010/0312769 | A1 | 12/2010 | Bailey et al. |
| 2011/0067030 | A1 | 3/2011 | Isard et al. |
| 2011/0078156 | A1 | 3/2011 | Koss |
| 2011/0096915 | A1* | 4/2011 | Nemer .................. 379/158 |
| 2011/0184806 | A1 | 7/2011 | Chen et al. |
| 2011/0206198 | A1 | 8/2011 | Freedman et al. |
| 2011/0213661 | A1 | 9/2011 | Milana et al. |
| 2011/0238496 | A1 | 9/2011 | Gurbuxani et al. |
| 2011/0238647 | A1 | 9/2011 | Ingram et al. |
| 2011/0264599 | A1 | 10/2011 | Dalton |
| 2011/0307429 | A1 | 12/2011 | Probst et al. |
| 2011/0320715 | A1 | 12/2011 | Ickman et al. |
| 2012/0005224 | A1 | 1/2012 | Ahrens et al. |
| 2012/0272160 | A1 | 10/2012 | Spivack et al. |
| 2012/0278164 | A1 | 11/2012 | Spivack et al. |
| 2012/0296920 | A1 | 11/2012 | Sahni et al. |
| 2013/0013801 | A1 | 1/2013 | Leeder |
| 2013/0018698 | A1 | 1/2013 | Parnaby et al. |
| 2013/0046603 | A1 | 2/2013 | Grigg et al. |
| 2013/0144682 | A1 | 6/2013 | Dhara et al. |
| 2013/0159507 | A1 | 6/2013 | Mason et al. |
| 2013/0198204 | A1 | 8/2013 | Williams et al. |
| 2014/0035920 | A1* | 2/2014 | Duwenhorst ............. 345/440 |

OTHER PUBLICATIONS

Wyatt et al. "Conversation Detection and Speaker Segmentation in Privacy-Sensitive Situated Speech Data", INTERSPEECH, 2007, pp. 4.*

U.S. Appl. No. 61/446,001, filed Feb. 23, 2011, titled Information Stream Personalization and Filtering.

U.S. Appl. No. 61/449,033, filed Mar. 3, 2011, titled Information Stream Personalization and Filtering.

U.S. Appl. No. 13/403,937, filed Feb. 23, 2012, titled System and Method for Analyzing Messages in a Network or Across Networks.

U.S. Appl. No. 61/591,696, filed on Jan. 27, 2012, titled Trending of Aggregated Personalized Information Streams and Multidimensional Graphical Depiction Thereof.

U.S. Appl. No. 13/752,333, filed Jan. 28, 2013, titled Trending of Aggregated Personalized Information Streams and Multidimensional Graphical Depiction Thereof.

U.S. Appl. No. 13/752,343, filed Jan. 28, 2013, titled Targeted Advertising Based on Trending of Aggregated Personalized Information Streams.

U.S. Appl. No. 14/021,685, filed Sep. 9, 2013, titled Targeted Advertising Based on Trending of Aggregated Personalized Information Streams.

U.S. Appl. No. 13/403,948, filed Feb. 23, 2012, titled Adaptive System Architecutre for Identifying Popular Topics From Messages.

U.S. Appl. No. 61/600,533, filed Feb. 17, 2012, titled Natural Language Processing Optimized for Micro Content.

U.S. Appl. No. 13/771,069, filed Feb. 19, 2013, titled Natural Language Processing Optimized for Micro Content.

U.S. Appl. No. 14/015,021, filed Aug. 30, 2013, titled Natural Language Processing Optimized for Micro Content.

U.S. Appl. No. 13/403,962, filed Feb. 23, 2012, titled Systems and Methods for Recommending Advertisement Placement Based on in Network and Cross Network Online Activity Analysis.

U.S. Appl. No. 61/678,057, filed Jul. 31, 2012, titled Discovering and Ranking Trending Links About Topics.

U.S. Appl. No. 13/844,588, filed Mar. 13, 2013, titled Discovering and Ranking Trending Links About Topic.

U.S. Appl. No. 61/678,565, filed Aug. 1, 2012, titled Discovering and Ranking Trending Links About Topics.

U.S. Appl. No. 13/936,072, filed Jul. 5, 2013, titled Discovering and Ranking Trending Links About Topics.

U.S. Appl. No. 14/073,275, filed Nov. 6, 2013, titled System and Method for Dynamically Placing and Schedulign of Promotional Items or Content Based on Momentum of Activities of a Targeted Audience in a Network Environment.

U.S. Appl. No. 14/073,693, filed Nov. 6, 2013, titled System and Method for Predicting Momentum of Activities of a Targeted Audience for Automatically Optimizing Placement of Promotional Items or Content in a Network Environment.

U.S. Appl. No. 61/768,351, filed Feb. 22, 2013, titled Systems and Methods for Determining Correlations Between Data Streams.

International Search Report and Written Opinion for Application No. PCT/US2013/52981, Date of Filing: Jul. 31, 2013, Applicant: Bottlenose Inc., Date of Mailing: Oct. 8, 2013, 10 pages.

International Search Report & Written Opinion for Application No. PCT/US2013/26763, Date of filing: Feb. 19, 2013, Applicant: Bottlenose, Inc., Date of Mailing: Apr. 23, 2013, 8 pages.

International Search Report & Written Opinion for Application No. PCT/US2012/026405, Date of filing: Feb. 23, 2012, Applicant: Spivack Nova et al., Date of Mailing: Dec. 28, 2012, 15 pages.

International Search Report & Written Opinion for Application No. PCT/US2012/026410, Date of filing: Feb. 23, 2012, Applicant: Spivack Nova et al., Date of Mailing: Sep. 23, 2012, 11 pages.

International Search Report & Written Opinion for Application No. PCT/US2013/023504, Date of filing: Jan. 28, 2013, Applicant: Bottlenose Inc., Date of Mailing: Jun. 11, 2013, 20 pages.

International Search Report & Written Opinion for Application No. PCT/US2013/26528, Date of filing: Feb. 15, 2013, Applicant: Bottlenose Inc., Date of Mailing: Apr. 18, 2013, 9 pages.

International Search Report and Written Opinion for Application No. PCT/US2013/68810, Date of Filing: Dec. 6, 2013, Applicant: Bottlenose Inc., Date of Mailing: May 7, 2014, 10 pages.

* cited by examiner

| User Analytics 400 ||
| --- | --- |
| User 402 | Jerry Smith |
| Age 404 | 25 |
| Registered Media Sites 406 | Twitter<br>Facebook |
| Social Influence Score 408 | 35 |
| Interest Profile 410 | NBA (0.5)<br>Basketball (0.4)<br>Whitney Houston (0.3)<br>iPad (0.2)<br>Greece (0.2)<br>Apple (0.2)<br>Romney (0.1) |

*FIG. 4A*

| Message Analytics 430 ||| 
|---|---|---|
| Incoming Message 432 | Message x ||
| Action Type 434 | Wall post from friend Alex Smith ||
| User 436 | Michael Fox ||
| Social Media Source 438 | Facebook ||
| Content Source 440 | www.cnn.com ||
| Message Analytics & Metadata 442 | Metadata | Playoffs<br>Knicks |
| | Annotations | News<br>Sports<br>NBA |
| | URL Metadata | Breaking news<br>USA news<br>Sports news<br>Finance news<br>Stock market |
| | Same/Similar Messages (Reposts) | Message A<br>Message D<br>Message E |

*FIG. 4B*

| Assistant Configuration Settings – Semantic Rules Set 450 ||
|---|---|
| IF a Message is received via 452 | one or more social media accounts such as Twitter or Facebook accounts |
| Where one or more of the following conditions are met. 454 | Message was<br><br>(any or all) of<br>    (posted, replied to, reposted, received, liked, annotated, read, saved, tagged, etc.)<br><br>by (any or all) of<br>    (one or more specific people, people I follow, people who follow me, people who follow some person, people with Klout score > x, people near some geographic place, people checked into some present activity, members of a list, any bottlenose user, people who have some attribute, people who do not have some attribute, or any person, etc.) |
| AND/OR: 456 | Message has (any or all) of the following parameters<br>- Type is (video, picture, etc.)<br>- Text contains (some text)<br>- Tags contains (hashtag, subject from taxonomy)<br>- Importance to me > n<br>- Relevance to me > i (Note: rename "Interest score" to Relevance)<br>- URL score is x<br>- Retweet score is y<br>- Popularity > 10 likes<br>- Activity > 3 hits per (minute, hour, day, week)<br>- Posted date is within (last n hours, days)<br>- Within (distance) from (geolocation) --- or some other way of expressing this<br>- Klout score of author is > k<br>- Parameter k has value j (Plugins can add new parameters) |
| THEN do action x 458 | where x could be any or all of such actions as:<br><br>show me the message in a particular view or stream, adjust the relevance or visibility of the message, play a specific sound, alert me by email, alert me by SMS, generate a desktop alert, highlight the message, automatically annotate or tag the message; OR<br><br>repost the message, delete the message, hide the message, file the message, reply to the message, translate the message, change the personalization score of the message, save the message, add the message to my interests, add the author of the message to my interest; OR<br><br>share the message, launch a plugin or another application, call a function, send the message to another application, export the message as data, view the message in a specific viewer, learn something from the message. |

*FIG. 4C*

SYSTEM AND METHOD FOR REVEALING CORRELATIONS BETWEEN DATA STREAMS

CROSS-REFERENCE TO RELATED APPLICATIONS AND EFFECTIVE FILING DATE ENTITLEMENT

This application is entitled to the benefit of and the right of priority to U.S. Provisional Patent Application No. 61/768,351, entitled "SYSTEMS AND METHOD FOR DETERMINING CORRELATIONS BETWEEN DATA STREAMS", which is hereby incorporated by reference in its entirety. This application is therefore entitled to an effective filing date of Feb. 22, 2013.

This application is related to U.S. Provisional Application No. 61/446,001, filed Feb. 23, 2011, entitled "INFORMATION STREAM PERSONALIZATION AND FILTERING"; U.S. Provisional Application No. 61/449,033, filed Mar. 3, 2011, entitled "INFORMATION STREAM PERSONALIZATION AND FILTERING"; U.S. Provisional Application No. 61/591,696, filed Jan. 27, 2012, entitled "TRENDING OF PERSONALIZED INFORMATION STREAMS AND MULTI-DIMENSIONAL GRAPHICAL DEPICTION THEREOF"; U.S. Provisional Application No. 61/599,355, filed Feb. 15, 2012, entitled "INTELLIGENT SOCIAL MEDIA STREAM FILTERING FOR BUSINESS PROCESS ENHANCEMENT"; and U.S. Provisional Application No. 61/600,553, filed Feb. 17, 2012, entitled "NATURAL LANGUAGE PROCESSING OPTIMIZED FOR MICRO CONTENT"; the content of which are incorporated by reference in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever. The following notice applies to the software and data as described below and in the drawings that form a part of this document: Copyright 2014, Box, Inc., All Rights Reserved.

BACKGROUND

Through web-based media services like Twitter and Facebook, a user of a network (e.g., a social network) is exposed to a vast amount of information from hundreds if not thousands of messages or other activities from different online sources including friends and merchants, culminating in a massive information overload. Individuals and organizations are increasingly unable to filter signal from noise efficiently, or at all, in the growing number of information streams with which they must interact on a daily basis.

Although there are traditional ways to analyze correlations among sets of data, they remain cumbersome and/or labor-intensive to unsophisticated general users and smaller companies. It is desirable to provide systems and methods which enable an integrated, user-friendly user experience with automated mechanisms that can reveal correlation between data streams to users in a clear and easily understandable way, so that the users can stay informed and responsive to current or new trends.

BRIEF DESCRIPTION OF THE DRAWINGS

FIG. 4A illustrates an example entry in a user analytics repository.

FIG. 4B illustrates an example entry in a message analytics repository.

FIG. 4C illustrates a table showing various configuration settings in a semantic rules set.

DETAILED DESCRIPTION

Figure 1:
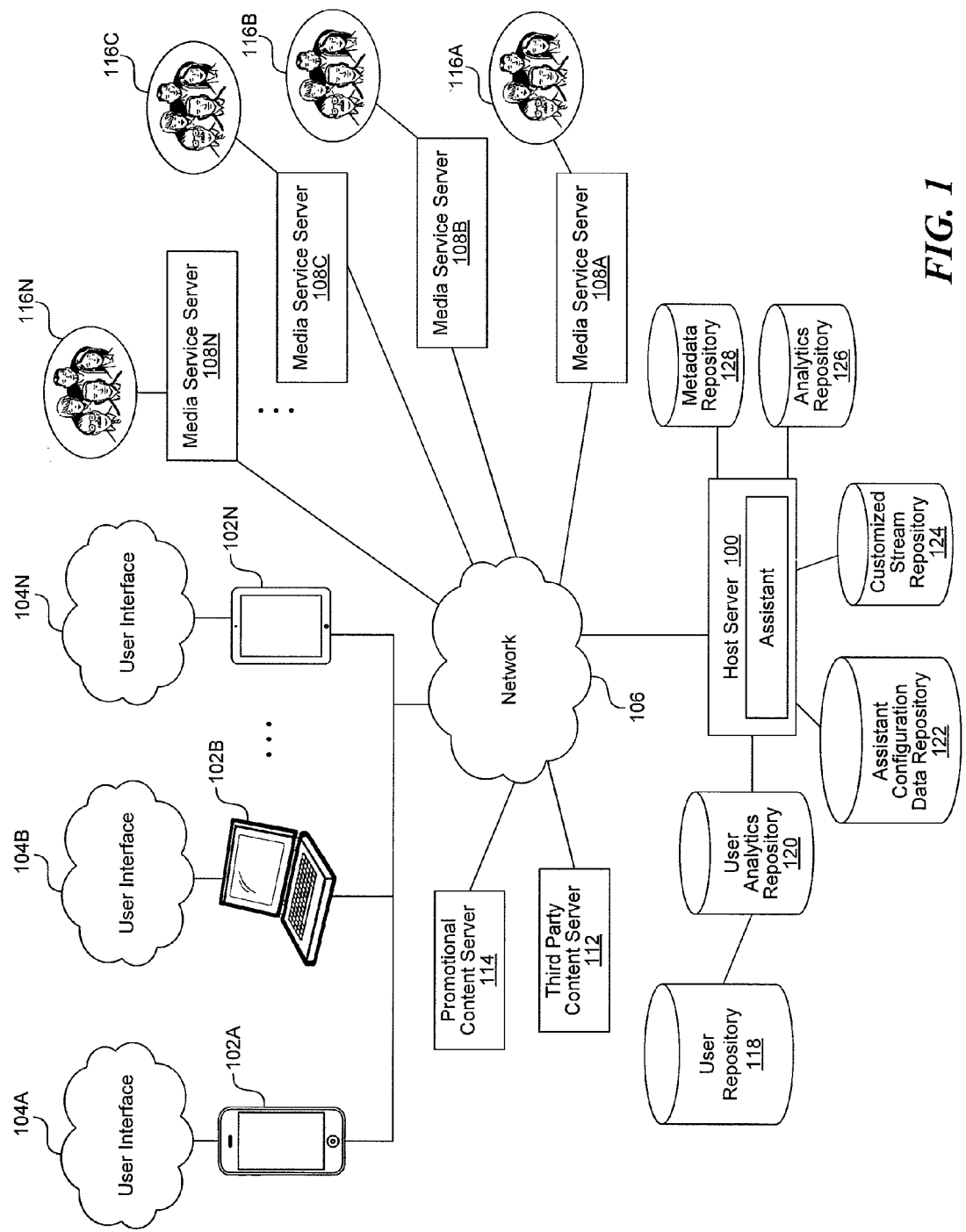
FIG. 1 illustrates an example block diagram of a host server of able to reveal correlation between data streams of activities in one or more networks to users in a clear and easily understandable way.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for determining and revealing correlations between multiple data streams. In one embodiment, a method for revealing correlations between at least two data streams and comprises, automatically importing a first data stream comprising a first time series of data signals from conversations occurred within one or more social networks. The method further comprises importing a second data stream comprising a second time series of data signals from a user selected data source. Each of the data streams includes a plurality of attributes which categorize a corresponding data stream's total volume. The method further comprises, responsive to a selection of one or more attributes of a respective data stream, displaying, on a user interface, data signals which correspond to the selected attributes using a time series plot. The method further comprises determining correlations between the data streams based on calculating a correlation score for each correlation between (1) each selected attribute in the first data stream and (2) each selected attribute in the second data stream; and displaying, on the user interface, correlation scores adjacent to their respective attributes.

In some embodiments, the method can further include, based on the correlation, employing a predictive algorithm to predict a future trend of the second series of data signals in the second data stream, and verifying the prediction by comparing the predicted future trend with real data signals as the real data signals arrive from the second data stream. In some embodiments, the predictive algorithm can be automatically adjusted based on results from the verification. The automatic adjustment can be governed by an unsupervised machine learning mechanism.

The disclosed techniques can provide users with a tool having an integrated, user-friendly interface and having automated mechanisms which can reveal correlations between data streams to the users in a clear and easily understandable way, thereby enabling the users to easily digest the vast amount of information contained in activities within one or more network, to understand the correlations among the activities, to stay informed and responsive to current or new trends, and even to predict future trends. Among other benefits, the disclosed techniques are especially useful in the context of discovering impacts of social networking activities on other types of commercial activities.

FIG. 1 illustrates an example block diagram of a host server 100 of able to analyze messages in a network 106 or across networks including messages to or from various online media services (hosted by media service servers 108A-N), third party content servers 112, and/or promotional content server 114.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

The client devices 102A-N, media service servers 108A-N, the respective networks of users 116A-N, a content server 112, and/or promotional content server 114, can be coupled to the network 106 and/or multiple networks. In some embodiments, the devices 102A-N and host server 100 may be directly connected to one another. The media services hosted by the media service servers 108A-N can include any online or web-based media services or networking services whereby a crowd or network of users contribute to the distribution of original or reposted content. These media services include, for example, Twitter, Facebook, Google+, Linkedin, and any other sites, services, or platforms where users can share information and networks with other users.

Figure 2A:
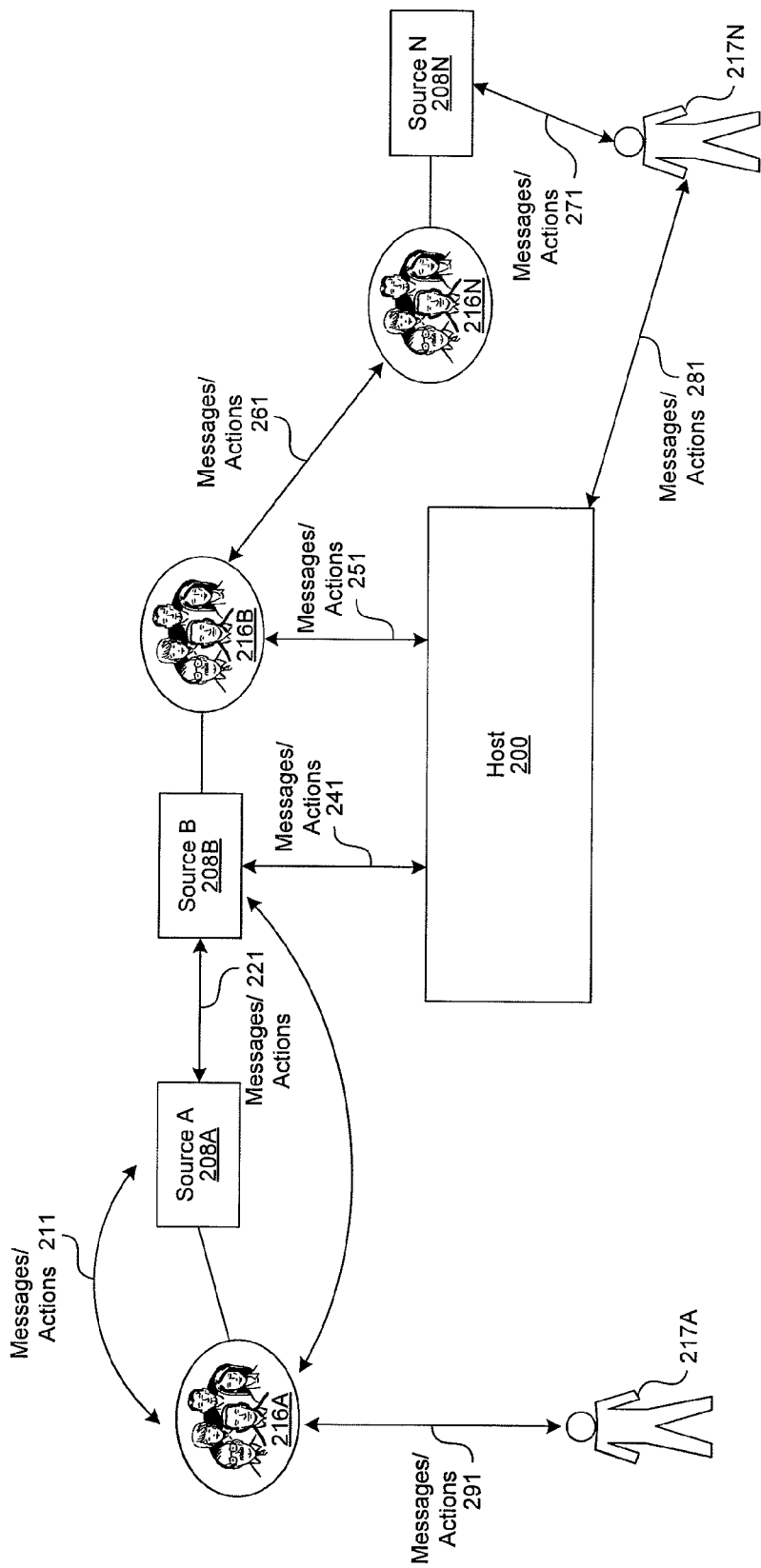
FIG. 2A depicts an example block diagram showing the various origins and destinations of messages which can be analyzed by the host server.

In one embodiment, the host server 100 is operable to analyze streams or sets of messages in a network or across networks to extract statistics to determine useful data such as trends, topics, behaviors, etc. The streams or sets of messages/content can be the target of any online or network-based activity, some of which are illustrated in the example of FIG. 2A. For example, any message or content resulting from or as the basis of activities between users and a network resource (e.g., content provider, networking site, media service provider, online promoter, etc.) can be analyzed for which analytics can be used for various applications including, content/message personalization/customization and filtering, trend/popularity detection (on certain sites (e.g., what's popular on Twitter in the last 2 hours), across all sites or select sets of sites, over a certain time period, in a certain geographical locale (e.g., in the United States), as relating to a certain topic (e.g., what's trending in sports right now), etc.) or a combination of the above. Additional applications include targeted advertising from a user-driven facet, platform-driven facet, timing-facet, delivery-style/presentation-style-facet, advertiser-facet, or any combination of the above.

In general, the host server 100 operates in real-time or near real-time and is able to generate useful analytics/statistics regarding network or online activity to detect current trends or predict upcoming trends for various applications. Delay time analytics and statistics can also be extracted in any specified timing window. In one embodiment, message/content analytics can also be used in generating unique user interfaces and UI features useful for displaying trends or popular topics/types/people/content in an intuitive manner for navigation.

Figure 3A:
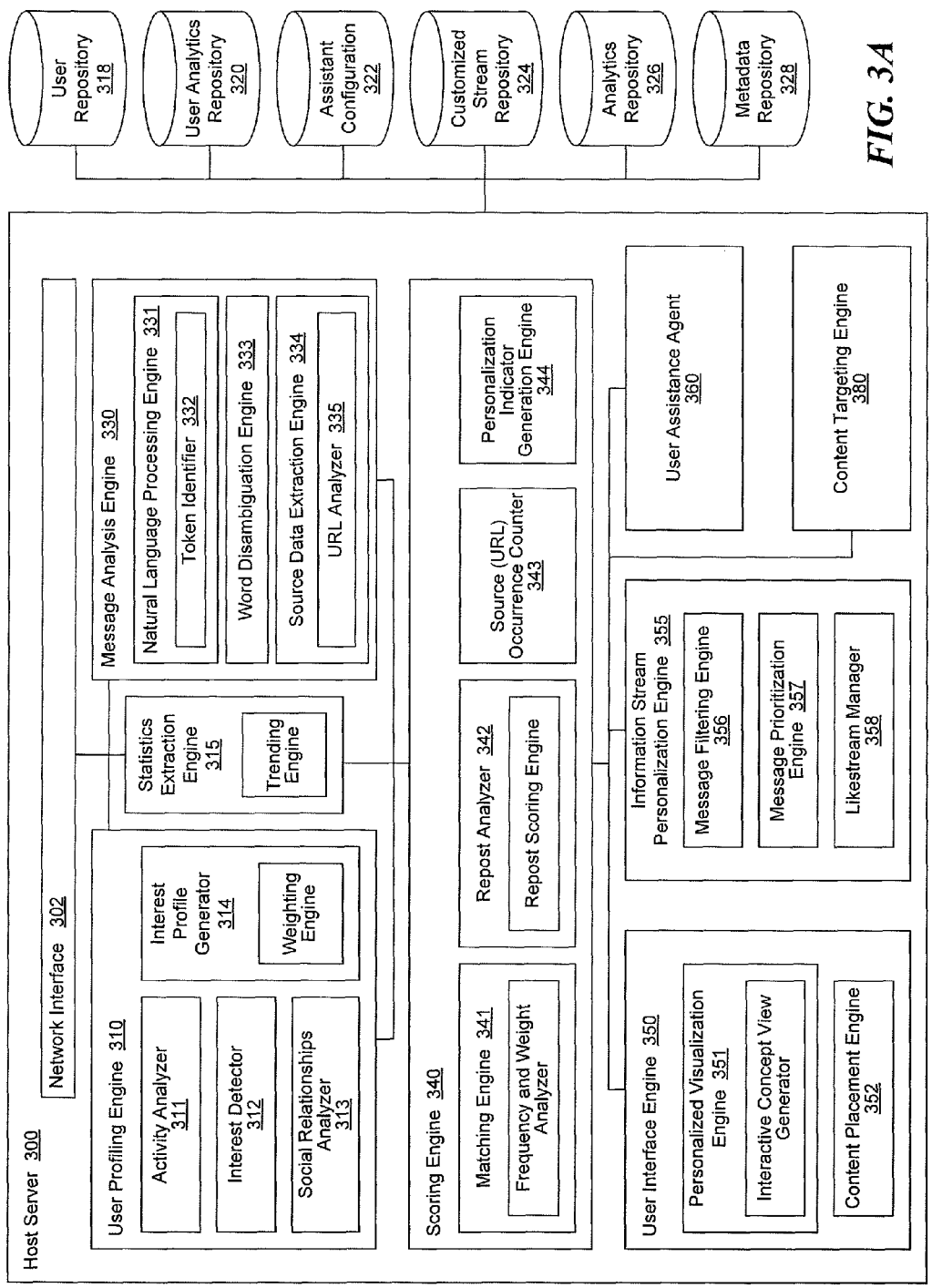
FIG. 3A depicts an example block diagram of a host server able to analyze messages in or across networks for various applications.
Figure 3B:
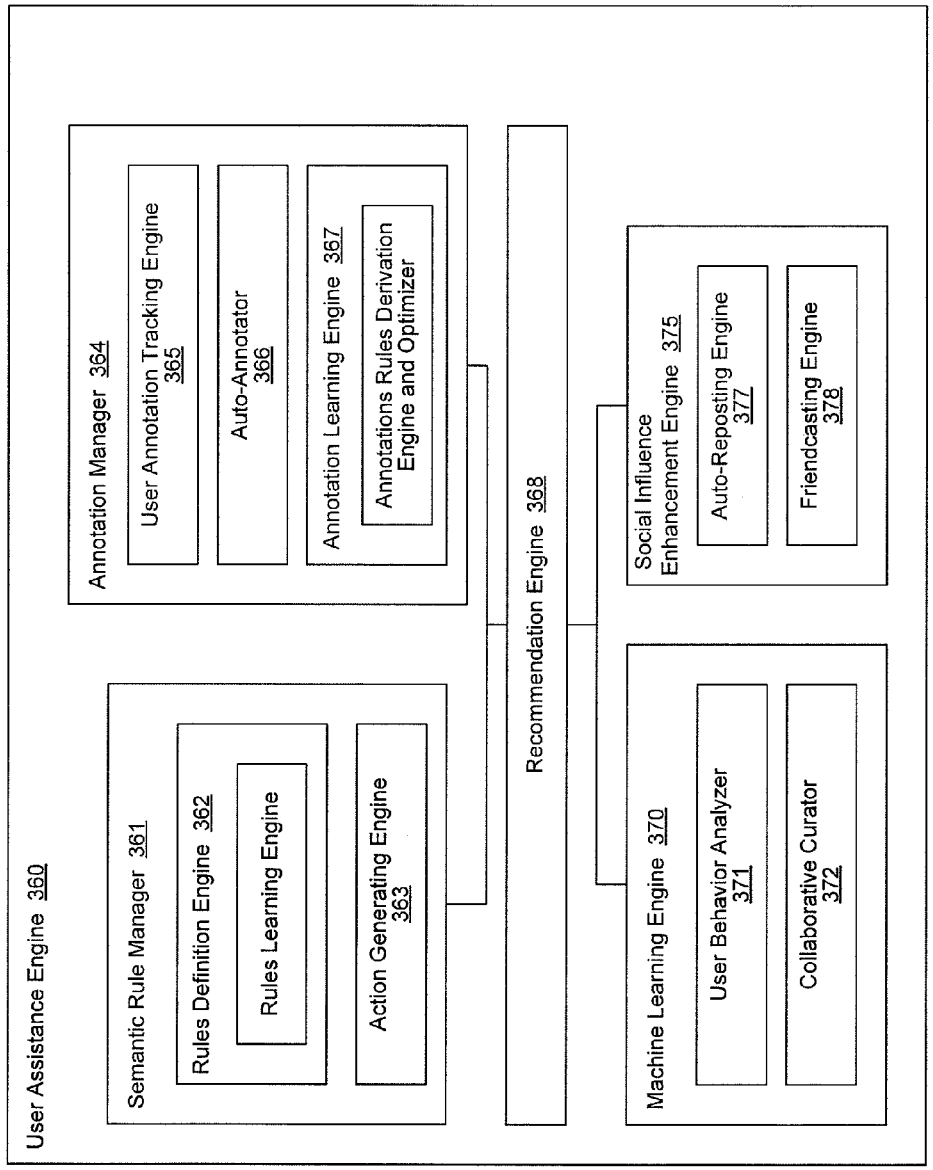
FIG. 3B depicts an example block diagram of the user assistance engine in the host server able to perform various customized actions on messages including to personalize and/or filter messages for users.

Functions and techniques performed by the host server 100 and the components therein are described in detail with further references to the examples of FIGS. 3A-B.

In general, network 106, over which the client devices 102A-N, the host server 100, and/or various media service servers 108A-N, content server 112, and/or promotional content server 114 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnection (OSI) protocols, FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 118, a user analytics repository 120, a configuration data repository 122, a customized stream repository 124, an analytics repository 126 and/or a metadata repository 128. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to provide data to be stored in the user repository 118, the user analytics repository 120, the configuration data repository 122, the customized stream repository 124, the analytics repository 126 and/or the metadata repository 128. The user repository 128 and/or user analytics repository 120 can store user information, user profile information, demographics information, analytics, statistics regarding consumed content and posted content, user influence, usage trends, trending topics, search terms, search trends, user response rates, topics of interest, online activity profile, topics of expertise, social relationships, friends on various networks or online media sites, social statistics (growth in friends, change in influence, level of sentiment or trust about them from others, where they fit in the social graph, who they are related to, who they are similar to), etc.

One embodiment further includes the assistant configuration data repository 122 which can store rule sets which specify actions to be performed on a message based on a detected condition or sets of conditions, for a given user or users meeting certain criteria, etc. The rule sets can be user defined or machine created (e.g., from machine learning user behavior or aggregate user behavior) to customize the way messages and content from various sources are organized and presented to a user or groups of users. The customized stream repository 124 can store streams of messages or content that is personalized or customized to individual users including streams with liked content, filtered content, categorized based on topic, type, content, associated users, people, related sites or sources, and/or prioritized content based on relevance or importance.

One embodiment further includes the analytics repository 126 which can store analytics or statistical data regarding messages, content, websites, searches, media network activity, or any online or network activity surrounding messages, content, people, events, online media sites, social media sites, content providers, any other third party services or online services, etc. The metadata repository 128 stores metadata for online content and messages. The metadata can be machine annotated or user annotated and can include both static and/or dynamic metadata which specifies semantic type or attributes of messages or other content.

Specifically, the metadata can be extracted or attached to messages/content in or across networks 106 by the host server 100. Metatdata can also include formatting and display information such as a custom avatar image, background, layout, font choice, stylesheet or CSS attributes. Message metadata can be extended by plug-ins as well, enabling additional layers of metadata and functionality to be added to messages via the host server 100.

Additional details of examples of types of data stored in repositories are illustrated with further reference to database entries shown in examples of FIG. 4A-FIG. 4C. More implementation details on techniques to reveal (e.g., by displaying, sending notifications, etc.) correlations between or among data streams, and techniques to adjust correlation algorithms and predictive algorithms which can be implemented on the host server 100 to determine or predict data streams are discussed in fuller detail below, and particularly with regard to FIG. 3A-FIG. 3D.

FIG. 2A depicts an example block diagram showing the various origins and destinations of messages/actions and/or content that are the subject of online or network activity. Any message/action/content that is the subject of online or network activity which is user-driven or machine-driven can be detected and analyzed by the host server 200 to extract useful information for trending, personalization, customizing, or filtering purposes. The content sources 208A-N and users 216A-N and 217 can be destinations/origins of any message/content or be the originator/recipient on an action performed on a message/content.

Actions can include, by way of example but not limitation, posted, replied to, reposted, received, liked, annotated, read, saved, favorited, bookmarked, viewed, deleted, tagged, commented, tweeted, linked, searched for, etc. Messages and/or content can generally include, messages associated with video content, messages associated audio content, and messages associated photos, any message interacted with by humans or machines, user profiles, user events, user likes or dislikes, status updates, mentions, news, news feeds, current events, breaking news, tweets, messages associated links, notes, web pages, documents, email messages, comments, chat messages/logs, SMS messages, etc.

Messages or content 211 can be sent between a network of users 216A of a content source A 208A (e.g., an online networking site or other content sharing/networking sites) or be the subject of online activity by users 216A of the online site of content source A 208A. The messages and/or content 221 analyzed can also be transmitted between sites (e.g., source A 208A and source B 208B).

The messages and/or content can include messages 291 acted upon between a user 217A and a social network of user 216A, messages 231 between a social network of users 216A and a different online network site (e.g., content source 208A), messages 241 acted upon between the host 200 and a content source (e.g., content source B 208B), messages/content 251 between a network of users 216B (e.g., users of Facebook or Twitter) and host server 200, messages/content 261 acted upon between users of different online networks (e.g., 216B and 216N), or messages/content 271 between any user 217N (e.g., a user who is not necessarily part of a given social network or any social network) and a source N 208N, or content/messages 281 between any user 217N directly to the host 200.

Figure 2B:
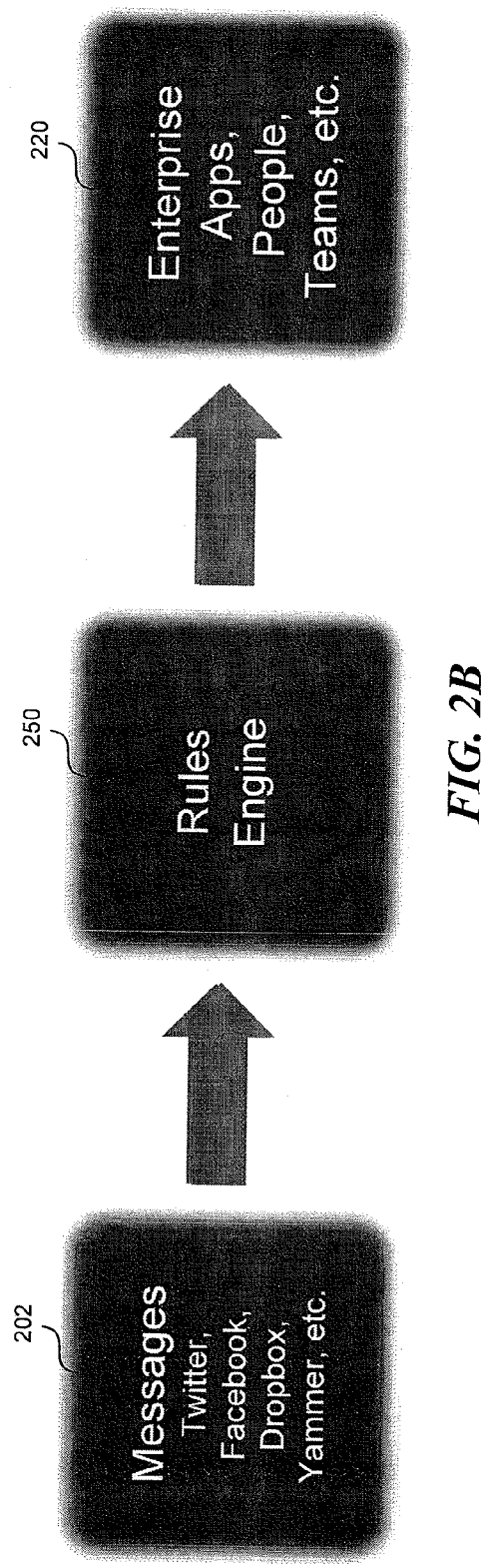
FIG. 2B depicts a diagram showing examples of media services whose messages can be analyzed for various applications.

FIG. 2B depicts a diagram showing examples of media services whose messages can be analyzed for various applications. The set of messages/content in question can be analyzed in accordance to set of rules applied by the rules engine. The results of the analysis and statistics can be used in various applications including individual users, for enterprises/companies or organizations, for teams of people or for specific applications, for detecting, identifying trends, filtering/prioritizing according to topics/trends/what's popular, and for generating interactive user interfaces which depict trends or popular topics/ideas/concepts updatable in real time or near real time. The interactive UI may also be actionable to navigate to or through related topics, tags, ideas, people, users, or content.

FIG. 3A depicts an example block diagram of a host server 200 able to analyze messages in or across networks for various applications.

The host server 300 can include, for example, a network interface 302, a user profiling engine 310, a message analysis engine 330, a scoring engine 340, a user interface engine 350, an information stream personalization engine 355, a user assistance agent 360, and/or a content targeting engine 380. Additional or less components/modules/engines can be included in the host server 300 and each illustrated component.

The network interface 302 can be a networking module that enables the host server 300 to mediate data in a network with an entity that is external to the host server 300, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 300 includes the user profiling engine 310. The user profiling engine 310 can be any combination of software agents and/or hardware modules (e.g., including processors and/or memory units) able to detect, aggregate, generate, create, predict, retrieve, determine, identity user interests and creating a profile from the user's interests, based from a user's online or network-based activities.

The user profiling engine 310 can, for example, determine the interests of a user without requiring any interaction other than to provide an online identity (e.g. Twitter or Facebook username or other online sites). The user profiling engine 310 can generate an interest profile (e.g., via the interest profile generator 314) with a list of concepts/topics that are of interest to a user. The concepts that are listed may be weighted (e.g., by the weighting engine) in accordance with level of relevance or level of interest to the user. For example, if a user is interested in the company "Microsoft" as detected from his/her feeds, status updates, messages, emails, etc. this word can appear in that profile, and it can be further weighted based on a level of interest as compared to other concepts/topics in the user's interest profile.

The user profile further includes an activity analyzer 311 which detects various user activities online for use in analyzing user behavior to detect/identify user interests in generating the interest profile. The activities that can be detected and analyzed include, by way of example, posted a message, shared a message, liked a message, favorited a message, tagged a message, annotated a message, rated a message, and commented on the message, replied to the message, viewed the message, saved or bookmarked the message.

The activities can also include activities/social relationships relating to other users as detected or analyzed by a social relationships analyzer 313 of the user profiling engine 310. For example, people parameters of people who interacted with a message, people who a user is friends with or connected to, followed people, following people, people who follow specified other people, people with a certain social influence level, geographical parameters of the people, membership or group affiliation, degrees of separation, screen name of an author, author follower count, author following count, author average messages per day.

User interests can be detected by the interest detector 312 by analyzing user content provided in the online activity at or via the online media services, the user content including user-submitted content or user-generated content. The interests of the user can also be determined from other users with whom the user is connected or is friends in the online media services.

The statistics extraction engine 315 reviews the results of the analysis and extracts quantitative information about the user and the associated interests. In one embodiment, the interests of the user are represented by concepts weighted according to analysis of user content which is subject of the online activities at the online media services, an example of which is illustrated in a data entry for user analytics shown in FIG. 4A. Weights can be assigned by the weighting engine based on results of activity and message analysis.

The statistics or any qualitative data computed as a function of time in a given time period or in real time can be used to detect trends (e.g., via the trending engine), potential trends or upcoming trends from any set of messages or online activity. For example, sets of messages relating to a given user can be analyzed to identify trends in the user's interest. Messages/content relating to a given platform can be analyzed to detect what is popular on that site right now. Messages/content relating to a specific topic (e.g., sports) can be analyzed to identify what's currently popular or trending in sports news.

Concepts or topics can be identified from messages by the message analysis engine 230 through natural language processing (e.g., by the natural language processing engine 231). The identified concepts or topics can be used to build a user's interest profile or to determine the related concepts/ideas of a given message, or piece of content to further determine appropriate action. When using message analysis to build an interest profile for a given user, the following steps can be performed:

1) Retrieve messages acted on (e.g., written, liked, commented, etc.) by user X. 2) For each message, detect language tokens (e.g. semi-colons, comma's, whitespaces, others, etc.) and identify social network tokens (e.g., hash tags, @ tags, +tags, or other tags, URLs/URIs, usernames, emoticons, micro-syntax, etc.). 3) For each message, assign part-of-speech tags to words using, for example, a dictionary (e.g. noun, adjective, verb, pronoun, unknown). 4) Collect nouns, pronouns and/or unknown words from all messages and take the most frequently occurring N words. 5) Refine/optimize this list of words by omitting common words and written expressions using dictionaries. The resulting interest profile will have a list of words. Each word can be assigned a weighting which is based on how often that word occurred in user X's online activity.

In general, the above analysis process can be applied to any set of messages to retrieve a list of words which can represent the common or frequently occurring topics, themes, concepts, places, people, or things, etc. Such detection can be used to detect, identify, predict, determine trends, upcoming trends, and/or popular topics/themes/concepts from any set of messages. The set of messages can be relating those across multiple platforms/services (e.g., all messages/content/activity on Twitter, Facebook and Linkedin in the last 10 hours), across a given platform/service (e.g., all activity on Twitter in the last 2 hours), across one or more platforms/services in a given geographical local (e.g., all activity on Twitter, Facebook in San Francisco), across one or more platforms/services for a given user, or a specific group of users, across one or more platform/services as pertaining to a specific topic (e.g., US Open, NBA, etc.), or any combination of the above parameters.

For example, a user can choose to detect trends in activities for people or a group of users that he follows on Twitter, or to access trends from last week. Changes in trends can also be determined, the strength of a given trend (e.g., how rapidly some topic/concept is becoming popular) can also be computed by performing quantitative analysis on messages/content and other activities occurring across a single network or multiple networks and any number of social media platforms.

In one embodiment, the concepts that are detected can be filtered/optimized from messages/content through disambiguation of a given keyword having multiple meanings (e.g. via the word disambiguation engine 333). For example, the word "Java" has multiple meanings/contexts including, for example, Java, the island in Indonesia, is it Java, the programming language. In this instance, disambiguation processes can be performed to determine which meaning of the word is applicable.

In some instances, disambiguation can be performed by analyzing the surrounding words in the sentence that the word occurred in. In this example, the surrounding sentence could be "I'm traveling to Java next week." VS "I was programming Java all day," which allows a system to decide the correct definition of the word.

In one embodiment, when the user profiling engine 310 builds an interest profile for the user, all words that are found are generally of interest to a user. So for this collection of words, the word disambiguation engine 333 can use the user, or the rest of the messages, as a context to disambiguate the meaning of the words. For example, in one embodiment, a large dictionary of known words and related categories can be locally stored, externally accessed/queried. For example, the dictionary can be synthesized by combining an encyclopedia's (e.g., Wikipedia or other databases) list of topics with the categories those topics belong to.

For messages/content pertaining to a user X, or for any given set of messages, there are a list of words P that need to be disambiguated. For each word in this list, all possible meanings can be retrieved. In this example, this would be "Java (programming language)", "Java" (the island). In one embodiment, for each meaning of each word, a list of all related categories can be determined and stored. In our example this would be "Programming, Computing, Programming Languages, etc." and "Indonesia, Asia, Country, Geography".

For the words in P, it can then be determined those categories that are most frequently occurring. This can be performed by counting and tracking the occurrences of each category across the words in list P. In one embodiment, the amount of category occurrences can then be used to assign a score to each meaning of each word. In this example, if "Programming" occurred multiple times, the meaning "Java (programming language)" will get a higher score. Therefore making this the most correct meaning of the word Java in a set of messages pertaining to user X, or any given set of messages.

In addition, in one embodiment, message analysis includes using information about the message source to detect and retrieve relevant information. For example, additional information about messages can be determined by retrieving and analyzing data for relevant URLs which host the message or content. In one embodiment, each URL or other types of content sources for a set of messages can be analyzed to retrieve and store the information. In addition, browser extension (e.g., bookmarklets) can be used to facilitate this.

For example, browser extensions can be provided to the users to share pages that they like when browsing the internet. In the background however, (without bothering the user), this extension can analyze the page, extract relevant meta-data (e.g. title, description, author, popularity, type, fields, media, etc.). The extracted information about the content source (e.g., URI or URL) can be sent to the host 300 and stored in a repository (e.g., the metadata repository 328).

The scoring engine 340 can determine the relevance of any message/piece of content to a given concept/theme/trend/topic/person/place, etc. The computed relevance of content/message to a concept can be used for various applications including, placement of the content/message (site, person, timing, etc.), retrieval of the content/message when relevant (e.g., when a search is conducted for the topic or a related topic, when a related topic is queried or selected, when the topic itself if queried or selected), placement of promotional content, relevance to a group of users, personalization of message streams for users through filtering and prioritization, etc.

In one embodiment, the scoring engine 340 can generate a score by matching message content against an interest profile or one or more concepts/topics/themes. The interest profile may be for a specific user or for a specific group of users, or just for any given context. The matching can be performed by the matching engine 341 by performing natural language processing to extract relevant concepts from the message or other content. These relevant concepts are then assigned a score by the scoring engine 340 based on, for example, the frequency with which a word occurs in a given interest profile (e.g., by the frequency and weight analyzer) and any associated weighting of the occurred word inside the interest profile (how interesting is that to the user or the query being made which is represented by the interest profile). In some instances, more than two occurrences or more can progressively increase the score.

In one embodiment, the scoring engine 340 modifies or determines the relevancy score based on any reposts (e.g., via the repost analyzer 342). For example, the repost analyzer 342 can compute or otherwise determine the number of times a given post or message occurred in other messages coming from connections or friends relevant to a given context (e.g., people in a certain user group, people with certain interest, people connected/friends with a given user, etc.). In order to compute the score based on reposts, the number of similar messages can be determined. However, in general, when users repost a message, they often modify the original message to make it fit within a certain character limit. Therefore simply finding messages with the same text might yield poor results since exact messages will only be found in limited numbers.

As such, for a reposted message R, a search needs to be done across all stored messages M. If there is a match, the Repost Score can be incremented and a similarity link can be stored by the repost scoring engine. In one embodiment, this can be performed by retrieving all stored messages M and compare each M to R and identifying the M that had the most words in the sentence that matched. In another embodiment, a database full-text 'OR search' can be performed with all words in the sentence of R. Then, rank the results according to the number of keywords that matched and select the top matching results as similar messages.

In one embodiment, for a reposted message R, a natural language processing tool can be used to extract words, keywords, symbols, and/or tokens for that message. The words/keywords can include, but are not limited to: Nouns, Proper Nouns and Adjectives; the tokens include, but are not limited to: URLs, hashtags, user names, emoticons or other symbols. The repost analyzer 342 can then sorted and packed the tokens and/or keywords/words together into a repost index RI which can be generated for each message in M. The Repost Score can now be determined by performing a single database lookup on RI in M. Such a query is resource and time efficient since it is an exact match on a database field that can be indexed a second time via database queries.

In some instances, content source occurrence frequency can also be factored in (e.g., determined by the source occurrence counter 343) to compute the score. For example, one message/piece of content may be more relevant if it is also from a source (e.g., as identified by a URL/URI) with some determined prior relevance to a context (e.g., a specific set of users, a topic, etc.). The score can be increased if the source is frequently occurring. The source occurrence counter 343 can compute how many times the URL in a message occurred in messages relevant to a given context (e.g., from friends or connections of a given user or people that the user is following, etc.).

One application of concept/idea/theme detection and trend identification is personalization of a message stream for a user. In one embodiment, personalized message streams can be created by filtering/prioritizing various messages for the user by the information stream personalization engine 355. The personalization engine 355 can use a score generated by the scoring engine 340 to determine relevance to a user, interest to a given user, based on any specified criteria (e.g., within sports news, tech news, within the last week, etc.). Based on the score with respect to any facet or context, the messages can be filtered by the filtering engine 356 and prioritized by the engine 357 such that a personalized/customized stream of messages can be created and presented to a user.

In one embodiment, one example of a personalized/customized stream of messages for a user is a "likestream," or a stream of messages/content that the user likes or might like, determined by explicit preferences or implicit preferences. For example, the host server 300 can provide a mechanism by which users may explicitly or implicitly "like" particular messages or people. By "liking" something a user explicitly tells the application that it is of interest. The host 300 (e.g., the personalization engine 355) then assembles a directory of the things the user likes. Within this directory, each faceted view, can be referred to as a "likestream" of things (e.g., messages, audio content, video content or any other content) that are liked by some set of users (such as a single user or even a community or group, such as people within an organization).

For each user x, a faceted directory hierarchy can be generated dynamically that contains all their implicitly or explicitly liked messages and/or people. This directory includes sub-directories, each itself a likestream, for various semantic types of messages liked by user x. For example, a typical likestream directory can include, one or more of:
  All liked items by user x;
  Videos liked by user x;
  Audio liked by user x;
  News liked by user x;
  Products liked by user x;
  Services liked by user x;
  Applications liked by user x;
  Photos liked by user x;
  Quotations liked by user x;
  Opinions liked by user x;
  People liked by user x;
  Ideas/concepts liked by user x;
  <other type> liked by user x.

Implicitly liked messages for user x may include any/all messages that user x has authored, replied to, reposted, saved, or shared. User x may also explicitly liked messages or people by taking an action to "like" them in the application. In one embodiment, rating scales for likes can be provided such that users can indicate the degree to which they dislike or like an item.

In one embodiment, Likestreams can be subscribed to by other users who are subscribers of the host service 300 or users of other platforms (e.g., users of other social media networks). For example, when user x views the likestream for user y it is possible for them to subscribe to it as a stream or interest. By subscribing to a likestream, it appears as a stream (with a corresponding editable rule definition) in user x's main dashboard, alongside other streams they can track (generated by other rule definitions). User x may opt to subscribe to user y's top-level root likestream or they can navigate directory facets to reach sub-level likestreams that match a specific patterns (for example, a likestream of only the videos, or only the news articles, that user y likes).

In one embodiment, Likestreams enable users to follow facets of people they are interested instead of everything those people post. This enables users to filter their message streams for only the kinds of messages they want from various people. When adding a likestream for another user y, user x automatically follows user y so that they can get their messages, although in a variation of this feature it is also possible to subscribe to a likestream without following the originator of the likestream.

In addition, Likestreams can also be browsed and searched, both by their owners and by anyone with permission to view them, and in such capacity they provide a means to aggregate and discover knowledge. Messages may have specific permissions associated with them which govern which users may take which actions on the message including, for example:
  Read
  Write
  Edit
  Delete
  Share
  Annotate
  Change permissions
  Rank, score, prioritize In one embodiment, likestreams can also be generated for sets of people, such as groups, lists, or communities of people. For example, a likestream, or any customized/personalized stream of messages could be generated for the set of all people a user follows, or just for all people tagged as "friends" or "family." A likestream can also be generated for all people who share specific attributes such as interests, relevance to specific topics, geolocations, or affiliations. In one embodiment, a likestream can also be generated for all members of the hosted service 300, or for all members of any social network. In general, likestreams can display messages chronologically and/or ranked by the degree to which they are liked and/or the number of people who like them.

The user interface engine 350 can customize the presentation of messages or content based on a given context with may be user or administrator specified. For example, the user interface can present topics or trend relating to 'tech news' or 'elections.' The user interface can also be configured to present messages/content in a personalized manner based on implicit and/or explicit user interests and/or preferences. In one embodiment, the visualization engine 351 creates a graphical visualization of concepts or topics contained in the messages/content based on a given facet (e.g., the context may be topic/concept driven, user driven, location driven, platform driven, or based on any other facet), with each concept or topic is represented by a label which is arranged radially from a node (e.g., as generated by the interactive concept view generator). Around this facet (represented by the common node), there are connected topics, keywords and tags all of which are relevant to that facet in a certain configurable/specifiable timeframe (minutes, days, weeks).

The graphical visualization can be interactive, where, responsive to detection of selection or activation of the label, information related to the represented concept or topic can be further depicted in the graphical visualization. The user interface engine 350 can also update the graphical visualization continuously or periodically (e.g., in real time or near real time) such that the depicted trends/popularity or relevance levels to various facets/users are current. The graphical visualization can also be manipulated to plot and depict past trends at or around a certain time or within a past time period. In general, each node has a different visual style (color, edge thickness, etc.) which is based on how interesting and relevant the node is to a facet or a user (when creating a personalized graph of concepts for a user). When clicking a node, it will show related topics, tags and keywords and it will display related messages/content in a new window or side panel.

In one embodiment, the host server 300 can provide mechanisms to reward users for certain social media behaviors and achievements.

Rewards can be provided in many forms—virtual currency such as points for use in the services hosted by server 300, facebook credits, etc., coupons or gift cards, physical goods and services, or physical currency, or in the form of digital achievement badges, or increases in a user's status, visibility, influence or relevance to others in the hosted network and/or any other networks.

Rewards can be provided for achievements such as:
Getting n followers
Recruiting n new users to bottlenose
Sending n messages
Liking n messages
Annotating n messages
Getting n likes on a message from others
Getting n likes in total from others
Getting n likes on their user profiles from others
Getting n replies on a message
Making n replies to other users
Getting n reposts on a message
Getting n views on a message
Getting n clicks on a URL in a message
Getting n views on their profile page
Getting n followers for a particular likestream of theirs
Achieving an expertise rank of n on a topic or interest
Achieving influence rank of n
Detecting and reporting spam or abuse
Rating content or users of the system
Adding plug-in to the system
Getting n downloads of a plug-in they added
Getting n likes on a plug-in they added In addition to gaining points, users may also lose points if they do things that are considered unwanted or harmful to the system, such as:
Adding content that is rated as spam or abuse by other members
Miscategorizing content when annotating it The host server 300 represents any one or a portion of the functions described for the modules. The host server 300 can include additional or less modules. More or less functions can be included, in whole or in part, without deviating from the novel art of the disclosure. The repositories 318, 320, 322, 324, 326 and 328 were discussed in conjunction with the description of FIG. 1.

FIG. 3B depicts an example block diagram of the user assistance engine 360 in the host server able to perform various customized actions on messages including actions to personalize and/or filter messages for users.

The user assistance engine 360 can further include a semantic rule manager 361, an annotation manager 364, a recommendation engine 368, a machine learning engine 370, a social influence enhancement engine 375 and/or a subscription manager.

The semantic rule manager 361 provides a rules interface, and engine, to manage, create, implement, revise, and/or optimize the rules which facilitate customized, application-specific, user-specific, use-specific manipulation, processing, retrieval, filtering, prioritizing of messages and any content in a given network, across networks, or across any number of different online media sites or platforms. The rules can be defined by a user, by a platform, a media site, the host server 300, a platform partnering with the host 300, an organization or any other consumer or business entity. In one embodiment, the rule set is specified by the user or other types of entities, via a user interface provided by the service which is independent of the online or web based media services. Based on the set of rules, the manager 361 can cause the server 300 to perform an action on an incoming message in accordance with a rule set to process the incoming messages. One example of an action is the likestream comprised of messages implicitly or explicitly liked by the user as defined by the rule set described in the example of FIG. 3A.

The rules managed and tracked by the manager 361 can be defined to perform actions on messages/content based on one or more specified criteria. The rules can be defined or specified by the rules definition engine 362 and can include application actions such as annotating a message, reposting a message, notifying a user, making a recommendation to a user, launching another application, presenting with increased or decreased visibility or taking some other action.

In some instances, the rules are automatically determined by default or automatically created by observing and learning system or user behavior (e.g., by the rules learning engine), as will be further described with reference to the machine learning engine 370.

The criteria can also be specified, defined, tracked or updated/revised by the rules definition engine 362 and can include, by way of example not limitation, if messages is received/acted upon via one or more of the following services, and/or message was (any or all) of (posted, replied to, reposted, received, liked, annotated, read, saved, tagged, etc.) by (any or all) of (one or more specific people, people I follow, people who follow me, people who follow some person, people with Klout score >x, people near some geographic place, people checked into some present activity, members of a list, any bottlenose user, people who have some attribute, people who do not have some attribute, or any person, etc. In general, the rules and criteria may take many features of messages, actions, and relationships, and any combination of the above into account.

The rule sets can be created and applied to create robots or assistance which can identify and customize message/content streams for any application, setting, context, or facet. An example table showing example rules sets to configure these assistants is illustrated in the example of FIG. 4C.

One feature of the host server 300 is the ability to support machine learning, creation, generation of rules of the machine learning engine 370 from observing, tracking, identifying, detecting, revising, and updating explicit and/or implicit user preferences/feedback from user specifications and/or behavior (e.g., by the user behavior analyzer).

Many learning rules are possible within the application framework, including by way of example but not limitation:

By analyzing user annotations, the machine learning engine 370 or the annotation learning engine 367 can infer and optimize rules that learn to automate user annotations in the future, and that learn to repost messages on behalf of a user.

Rules relating to people by adding people to a given user's interests or as being relevant to any given facet: The user behavior engine 371 can for instance, determine how much a user X interacts with user Y—for example by measuring how often they interact in one or both directions via replies, mentions, direct private messages, and reposts, or how often they "like" messages by one another, or click on links in messages that are posted by one another. When user X is measured to interact with user Y above a quantitative or qualitative threshold, recommend that user X adds user Y as an interest (interest stream and/or relationship), or automatically add user Y as an interest (which may be a function of yet a higher threshold or the same threshold).

Rules relating to site or content by adding sites to a user's interests or as being relevant to any given facet: The user behavior analyzer 371 can detect sites that a user X cites a lot in their outgoing messages, reposts, mentions, replies, or "likes," can automatically become interests, or can be recommended to be added as interests for user. Once added as an interest, any messages that are received that cite URLs in sites of interest may then have a higher personalization score for user X or any other specified context/facet automatically.

Add a message to as an interest (via explicit learning) to a user or relevant to a facet: For a given message, a user can add it to their interests manually—they can specify what they want to add (the author, the content, particular topics, everything). The machine learning engine 370 can add the person who made the message automatically (even if the user doesn't follow them yet), as well as relevant keywords or patterns in the message such as the URL and tags etc. By adding to their interests in this manner, the engine 370 learns they are interested in this pattern such that future messages which are received and match the interest will receive a higher personalization score for the user. Similar process can be performed for facets/applications other than specific users, to identify relevant content based on key words, patterns or other criteria.

Ignore messages: The machine learning engine 370 can learn to automatically filter out or ignore messages that match certain patterns such that spam, offensive content, or all content from a specific party can be screened out for a user or for any specific application/context/facet.

Boost messages: The machine learning engine 370 can also learn to automatically boost the visibility or personalization score of messages that are more likely to be relevant to a user or any other given facet/context. In the case of a user, if a user X likes a lot of messages by some author Y, then the engine 370 can learn to make all messages by that author Y more important for user X. Similarly, the engine 370 can learn to boost the personalization score of messages that match various other patterns such as having specific attributes or being relevant to specific interests.

In addition, through the host server 300, anyone can mark any message as having any semantic type or attributes. This may eventually result in some percentage of miscategorized messages. The server 300 may be configured to leverage collaborative filtering in order to curate messages, and detect and filter out errors (e.g., via the collaborative curator 372 of the machine learning engine 370).

One example method for collaborative filtering is as follows:

1. When user a marks item P as type x, then it shows up as type x for that user only no matter what (even if other people disagree).

2. Types added to item by the item's author are innocent until proven guilty: They automatically show up for the crowd until and unless >n non-authors of item subsequently disagree by unmarking type x from item. If the item is unmarked by the crowd, then x doesn't show up on item for anyone other than author anymore. In other words, the author's types show up for everyone, but are removed for everyone other than the author, if enough people disagree.

3. Types added to item by non-authors of item are guilty-until-proven innocent. If >m non-authors of item mark item as type x, then x shows up for everyone. In other words, there must be some agreement before an item will show up as type x, for people other than the person who marks it as x. One exception is of course if the author marks the item as x—in which case see (2).

4. The variables n and m (the thresholds for "disagreement" and "agreement") can be changed dynamically to adjust the curation thresholds.

Another aspect of machine learning or learning from the user crowd is leveraging message annotations by users (e.g., via the annotation manager 364). For example, if a user shares a message with a URL to the Youtube website, the server 300 can, based on various analysis techniques determine that the message is associated with a video. In some instances, the user can be queried to assist in determining what a message relates to. For example, the host server 300 (e.g., via the annotation manager 364) can query a user when it is posting a new message, reposting an existing message, liking an existing message, or otherwise acting on some message or content.

Once the message has one or more types associated with it (as tracked by the annotation tracking engine 365), the server 300 now has the ability to better provide better filtering of that message or related/similar messages/content all other users. For example if user A and user B have a filter specified for receiving messages that are marked as "News", there could be a message M that has no type associated with it. When user A likes the message and assigns the type "News" to it, then the message will be filtered as "News" for both user A and user B.

In addition to enabling manual annotation of messages/content by users, rules can be generated which are capable of automatically annotating messages (e.g., by the auto-annotator 366) with metadata when the messages match specific patterns—such as originating from specific URLs or URL fragments, containing specific keywords, being posted or authored by specific parties, containing specific strings.

In addition, by analyzing sets of manually annotated messages, new annotation rules can be automatically derived and optimized over time (e.g., by the annotation learning engine 367), that generalize from collective annotation behavior. For example, if a community of users consistently annotate messages containing pattern x as being of semantic type y, then a rule can learn to make such an annotation automatically when a high enough degree of evidence is accumulated to have sufficient confidence in what has been learned.

In one embodiment, the host server 300 includes the ability to recommend online actions (e.g., including identification of online messages/content) that facilitates enhancement of social influence by a user or any other entity (e.g., business entity, organization, application, idea, concept, or theme). In one embodiment, the host server 300 through the social influence enhancement engine 375 can add an additional indicator (e.g., an influence weight indicator) to detected, tracked, stored, and/or analyzed messages/content. This weighting or indicator resulting in an overview identifying messages/content that can be reposted by the user (or some other physical entity such as a corporation or physical entity representing some ideology) to gain more network influence. The social influence enhancement engine 375 can also recommend certain actions in addition to posting/reposting messages (e.g., liking posts, friending certain people or entities, commenting on certain messages/content) which can also result in enhancement of social influence of a user or entity.

In one embodiment, the engine 375 computes the weighting by looking at the strength of a friend connection and the number of friends of that friend. Also, more sophisticated influence information is gathered by integrating with influence metric services like Klout.com. By measuring the relevance of a message to the interests of a user's followers an algorithm can determine whether the message should be reposted. By measuring historical diffusion of similar messages in a social network, the algorithm may estimate to what degree a particular message might spread further, via a person's followers, and may also recommend what times of day it should be posted in order to attain the maximum attention and spread.

In one embodiment, the server 300 provides auto-reposting capabilities for messages/content (e.g., via the auto-reposting engine 377) based on conditions or criteria that is user configured, auto-configured, or determined by any other third party services/interests.

For example, the auto-reposting engine 377 can provide a variation of Auto-RP in where certain messages are recommended for repost. The user or some other entity can then decide to repost the message or dismiss it. The criteria for auto-reposting or recommending a message/piece of content for repost, or for recommending that some other action be performed, can be based on multiple scores. These can include by way of example but not limitation:

Repost Score (see above)
URL Score (see above)
Frequency of interactions with the user that posted the message
An automatically learned weighting of previous interactions with similar messages
Explicitly user defined matches
The level of influence (such as Klout score) of the author of the message
The strength of relationship between the user and the author of the message (determined for example by the number of times the user has reposted, direct messaged, mentioned, or replied to the author, and/or the number of times the author has reposted, direct messaged, mentioned, or replied to the user.
The number of people who the user follows, who also follow the author of the message—a measure of similarity between the user's interests and the interests of the author.
The degree to which followers of the user may be interested in the author's message, determined for example by measuring the relevance of the message to each of the user's followers.

Formulas that include the above criteria and/or others, can generate a cumulative score for the message/content, or some other related action with respect to a network activity on a media site. A threshold may be defined such that if the score crosses the threshold, then a recommendation to repost a message is made. Users may opt to configure the auto-repost engine 377 to repost qualifying messages automatically, or to simply recommend them so that they can choose to repost them manually.

In one embodiment, the auto-reposting engine 377 can learn reposting rules for specific users or entities or other contexts, for example, by analyzing which messages they have reposted in the past in order to develop statistical models and/or pattern rules that can infer when to repost a new message. For example, if a user x has often reposted messages by another user y in the past, then the probability weight that they should repost any new message by user y in the future is increased. Similarly, by analyzing the features of such messages, the times of day, and the social relationships between user x and y, the precision of such rules can be adjusted and further optimized.

One embodiment of the host server 300 further includes a friend casting engine 378 which provides a default 'Friendcasting Assistant'. This assistant allows a user x to specify rules that will automatically repost a message from another user under certain conditions. For example, a user x can define that all messages that match a pattern y (such as having a certain hashtag like, '#cast', @ tag, +tag, and/or containing certain keywords or strings or URLs, and/or originating from a user u that matches whitelist W) will be automatically reposted by user x. This enables people to request that their friends repost particular messages by simply attaching the appropriate hash tag (such as #cast) or @ tag, or other tags to their messages, instead of having to make a direct request for a repost via a message to each person.

The recommendation engine 368 can, using the output of the annotation manger 264, the machine learning engine 370, and/or the influence enhancement engine 375 and make the appropriate recommendations to a user, entity, or any other party or representative accessing the services/features of the host server 300. The recommendations can include rule/action sets defining assistants which are use, application, context, and/or user specific, recommended or suggested annotations based on observation of system and/or user actions/behaviors, recommendations of actions including posts/comments/reposts of content/messages which may enhance social influence of a user or any entity/party/representative, concept, theme, organization.

Figure 3C:
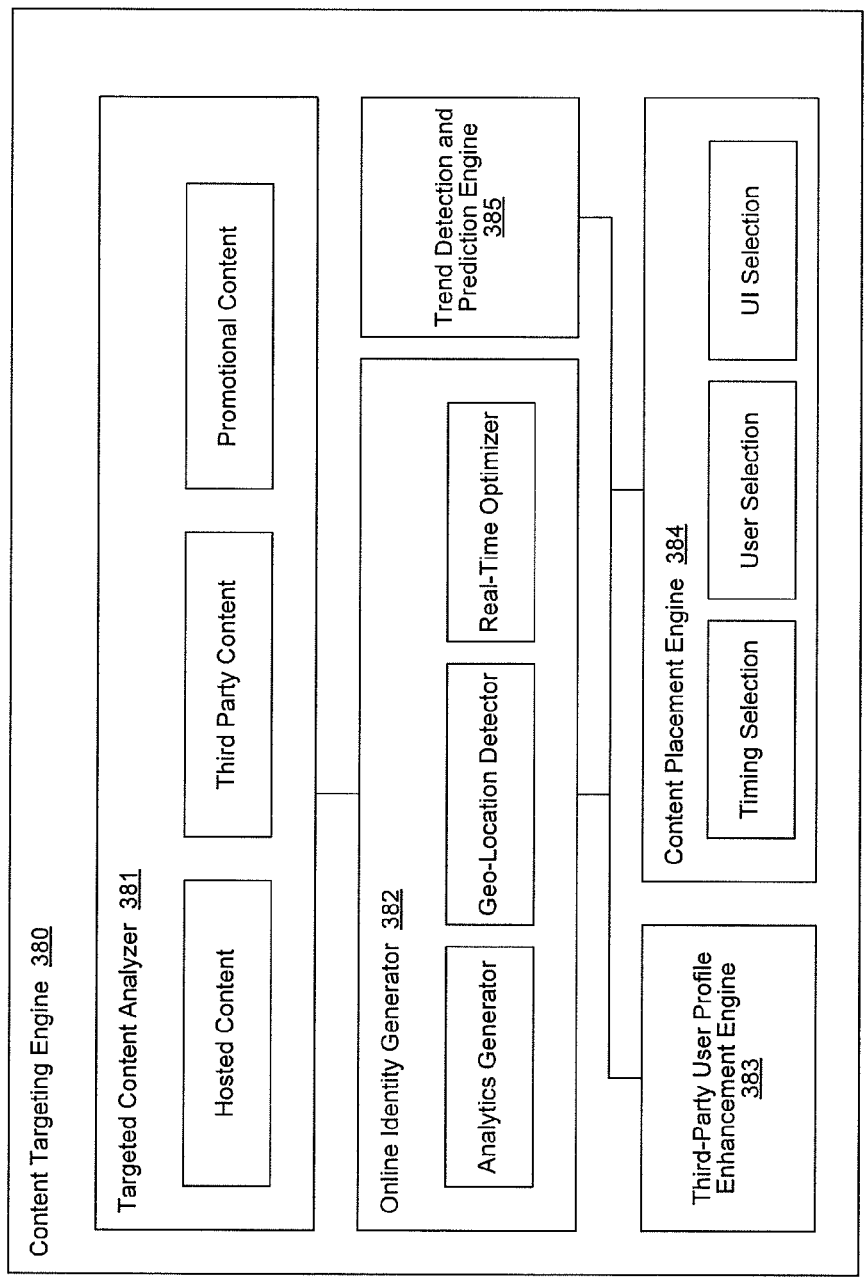
FIG. 3C depicts an example block diagram of the content targeting engine of the host server able to recommend ad or placement of other promotional content based on trends identified from the analysis of activities occurring in or across networks.

FIG. 3C depicts an example block diagram of the content targeting engine 380 of the host server 300 able to recommend ad or placement of other promotional content based on trends identified from the analysis of activities occurring in or across networks.

The content targeting engine can further include a targeted content analyzer 381, an online identity generator 382, a trend detection and prediction engine 385, a profile enhancement engine 383, and/or a content placement engine 384. Additional or less components can be included in the host server 300 and each illustrated component.

The platform hosted by the server 300 can in some embodiments, additional provide targeting content (e.g., advertisements, coupons, ideas or other promotional content) to users of a client application, or other application that use platform's API, or other applications otherwise in communication with the server 300 and/or its visitors/users. Promotional content (e.g., advertisements) can be targeted to users based on a number of methods:

Targeting to user interest profiles (e.g., which can be used by the online identify generator 382 to generate an online identify for a user)—each user has a rich interest profile generated by the host server 300. This profile can include statistics about many dimensions (e.g., generated by the analytics generator) of the user, for example: their interests, their social relationships, the degree to which they trust other people on various topics, the degree to which other people trust them on various topics, their social influence, their demographics, the sites they are interested in, the content and products they are interested in, statistics about the people they repost or reply to or who repost or reply to them, the people they are interested in, their present geo-location and path, as well as other locations they are interested in, etc.

Their online activity including information regarding, various types of content they are interested in (videos, audio, questions, classified ads, etc.), their usage behavior with respect to the platform hosted by server 300 (how often the login, stats about their messaging activity, various analytics of their usage activity to derive trends (e.g., by the trend detection and prediction engine 385) about when they are active and what gets them to take various actions in the application such as clicking an ad or reposting a message, etc.), trends in their interests (such as which interests are gaining or decline with what momentum) and trends in their social relationships (such as which people they interact with more, read more, repost more, reply to more, pay attention to more).

Profile information can be determined by the online identify generator 382 from existing user profiles of the user on the Web, as well as from profile information that is manually contributed by other users, as well as information that is derived through data mining, analytics and machine learning of user behavior by the platform hosted by server 300 (e.g., the analytics generator) and any other networks such as media networks and/or social networks (such as Twitter and Facebook).

Note that the trend detection and prediction engine 385 can identify past trends and current trends from any set of messages/activity occurring in one network (e.g., one social media network) or across multiple networks (e.g., multiple social media networks). The trends that are detected or identified need not be for a specific user, but can be for a group of users or based on some other context. For example, trends in sports news, or trends in the economy, or trends/what's popular in the SF bay area, or trends in Europe, or what's popular among Facebook users in India, can be detected and identified. The promoter/advertiser can specify the facet with which to view analytics to identify ideal targets for the promoted content.

In addition, emerging or upcoming trends, such as a prediction of trends can also be performed by the trend detection and prediction engine 385. For example, upcoming or emerging popular topics/concepts/figures can be detected versus topics/concepts/figures which are generally popular (e.g., steady state). For example, in the context of NBA, the figure 'Jeremy Lin' can be detected as an emerging popular trend of a recent few weeks where as 'Kobe Bryant' can be identified as a generally trendy topic for several years among NBA fans or sports news.

With placement, the content placement engine 384 can overlay content among message/content streams in the platform hosted by the server 300. The content can include content that is created within the platform of the host server 300, to other users the same platform or other platforms, or clients accessing the same platform (e.g., desktop application or a mobile application/client). The content that is placed based on user, activity, geolocation, UI placement, and/or timing targeting can also include third party content. In general, the Bottlenose content can include any kind of content (text, graphics, audio, video, animation, ads)

In general, the content placement engine 384 can place content anywhere in the platform or any other clients for accessing the platform—for example: on pages, screens or windows in the application; as messages or as blocks of content in the messaging area that behave like messages; in the banner, footer, or sides of the application window. The UI selection engine can identify the suitable placement within a page in a given user interface.

In one embodiment, the content can be automatically to external networks such as Twitter or Facebook. In some instances, it remains within the hosted platform but provided to third-party applications that request such information from the host server 300.

The targeted content analyzer 381 can analyze content on the fly, for example, when messages or content are shown to users via the hosted platform. The analyzer 381 can determine the relevant concepts and interests, and show any relevant promotional content in the user interface to the user, either via the web-based client, a desktop client, and/or a mobile client. The promotional content (e.g., either created within the platform of the host server 300 or whether it is third party content) can appear within the user interface in several ways: as banner or sidebar ads, adjacent to a message/content stream, next to or within search results in the hosted application or any other applications that obtains search results from the hosted platform, or directly within the stream of messages/messages depicted in the user interface, but appearing in a different manner, as can be determined by the content placement engine 384.

In one embodiment, by showing ads or other promotional content within the message/content stream, the host server 300 can also overlay its own ads on the message/content stream—such as a message stream of external social media (e.g., Twitter or Facebook) messages/activities/content—without altering the original message stream or posting any ads to the external services (e.g., in Facebook or Twitter platforms). In other words, the content targeting engine 380 can interleave the promotional content with the messages. For example, the interleaved content can look like specially formatted messages—but they are marked as ads.

For example, an ad from the host 300 can appear between two messages from other networks such as Twitter or Facebook. The promotional content/item can reside, in one embodiment, in the hosted platform and only shown and depicted to users of the hosted platform and not posted out to Twitter or Facebook as an actual message.

In one embodiment, the promoted content can be created as message annotations within streams (e.g., by the placement engine 384). For example, the engine 384 can make create words within messages/content (such as messages from Twitter) into hotlinks or hover-points. When a user either clicks on them or hovers over them, relevant information can be shown which may include advertising or marketing messages. In one embodiment, ads such as banners, ads that appear woven between messages, and annotations to message content, can be targeted to the content of the message(s) that area appearing to a user and/or to the specific user's profile information (e.g., via the user selection engine of the placement engine 384). In other words promotional content targeting can be based on message content or can be based on user-targeting, or both. In addition, targeting can further include location or timing factor considerations, for example, when factoring into trends or "what's hot/popular" as these categories can include a location or timing parameter, or both.

In one embodiment, the server 300 provides special "bots" (software agents) that perform tasks within hosted application as well as client applications. Bots are special type of the Assistant, as previously described with respect to the example of FIG. 3B. In one embodiment, bots are capable of monitoring what a specific user is sending messages about (such as what they are tweeting about), and then intelligently replying to the user with responses of various kinds (such as to provide relevant information, to ask the user relevant questions, to offer relevant advertising, to provide relevant advice, to give relevant feedback or praise to the user).

For example, an advertising bot can monitor what a user is talking about in platform, or external platforms, and if it notices that they have changed location and are asking about where to have lunch, it might then recommend places near the user's present location where they could have a lunch they would like. Or for example, when a user sends messages about a particular product or technical need, the bot could reply with an offer of competing products, or related coupons or special offers, or an offer for information related to the product or need, or could even connect a live sales agent with the user and enable the sales agent to reply to them right away.

In another example, a concierge bot could respond to simple questions and commands from users to get information or execute and complete certain tasks. If a user addressed the concierge bot with a private message containing such a request or command, the concierge can then go to work on the task for the user, and reply to them with questions or results. For example the concierge bot could respond to a user's request to book a flight, or book dinner reservations, or order a cab. It can interact conversationally with the user to ask further questions in order to complete the task, disambiguate what the user wants, narrow results, make choices or purchases on behalf of the user, or provide user information to other services when requested by them.

A concierge can also provide personalized recommendations or advice to users as they do things while using Bottlenose. This can include giving them either solicited or unsolicited suggestions, whether the user is actively engaging with the Bottlenose app or the app is idle. For example, if the user is actively using the app to read something or send messages or engage in a conversation the concierge can make relevant suggestions to what it sees them doing; but even if the user is not actively engaging—such as when passively walking down the street—for example, by detection of their location for example via their mobile device, then the concierge bot can make relevant suggestions to the user for their present location and possible activity or goals or interests at that location.

In one embodiment, the server 300 can generate the analytics (e.g, by the content analyzer 381 and the online identity generator 382) and provide analytics systems both to users of Bottlenose and marketers/advertisers. Analytics that are generated can provide high level as well as granular data and analysis about user behavior, usage trends, aggregate user behavior, search terms and search trends, overall interest trends (past trends, current trends, emerging or predicted trends), user value, user influence, user expertise, user response rates, etc.

In one embodiment, analytics which are generated by the server 300 can provide each user with a detailed report of how they are performing, and how each of their messages has performed in the platform hosted by server 300 as well as in other social media networks, that the host 300 can analyze.

In one embodiment, the targeting engine 380 can provide advertisers and marketers with analytics to help create and target campaigns to user segments (by interests, demographics, geography, user behavior statistics, time slots, industry or affiliations to organizations, political affiliations, sentiment on various topics, or relevance to clusters of attributes or particular topics). Analytics may also enable advertisers to measure and adjust the performance of a campaign in real time, manually or automatically, to optimize for specific advertiser-goals (such as get the most clicks, or reach the most people, or generate the most sales, etc.)

In one embodiment, the targeting engine 380 can annotate third-party user profiles (e.g., via the user profile enhancement engine 383) to add richer information to them, when they appear in the hosted application environment or on third-party clients or applications that show those profiles. Within the hosted platform, user profiles may display plug-ins, or may have new features provided by plug-ins. In addition, through the platform of the host server 300, users can add new tags to their profiles, as well as new fields, new metadata, and new data. Users can also customize the design of their profiles (adding their own HTML, CSS, layout or template, or specific design elements)

In one embodiment users can add custom content to their profiles, such as new sections of content, edit and modify their interest profiles—to add an interest, or modify their level of interest in a topic. In addition, user profiles or an online identify profile generated by the generator 382 can include visualizations of user social relationships, or provide analytics on their value to the network or their behavior, or their social statistics (such as growth in friends, change in influence, level of sentiment or trust about them from others, where they fit in the social graph, who they are related to, who they are similar to, etc.)

In one embodiment, profiles can provide as a mechanism to send a message to a person, where that message may be screened or may require a fee to send, or may be sent without restrictions. Messages sent to users via their profile pages may also be semantically tagged to be of a specific type, like any other Bottlenose messages.

In one embodiment, profiles can provide alerts to the people they represent and to people who visit and view these profiles. Alerts might include a notification that the user being viewed is presently geographically near to the user viewing the profile, or they might be notifications that the viewing user shares certain interests or friends with the user being viewed. In one embodiment, profiles can provide additional functionality for initiating various actions between the person they represent and the party viewing the profile (such as scheduling a meeting, or making a phone call, doing a video conference, providing an endorsement or requesting one, making a request or offer, or doing a transaction).

In one embodiment, profiles can provide different information to the party that owns the profile than to parties who don't own it and are just viewing it. The owner of a profile may be able to see analytics and statistics about themselves that are not visible to anyone else. In addition personalized and private services may be provided to the profile owner via their profile.

Figure 3D:
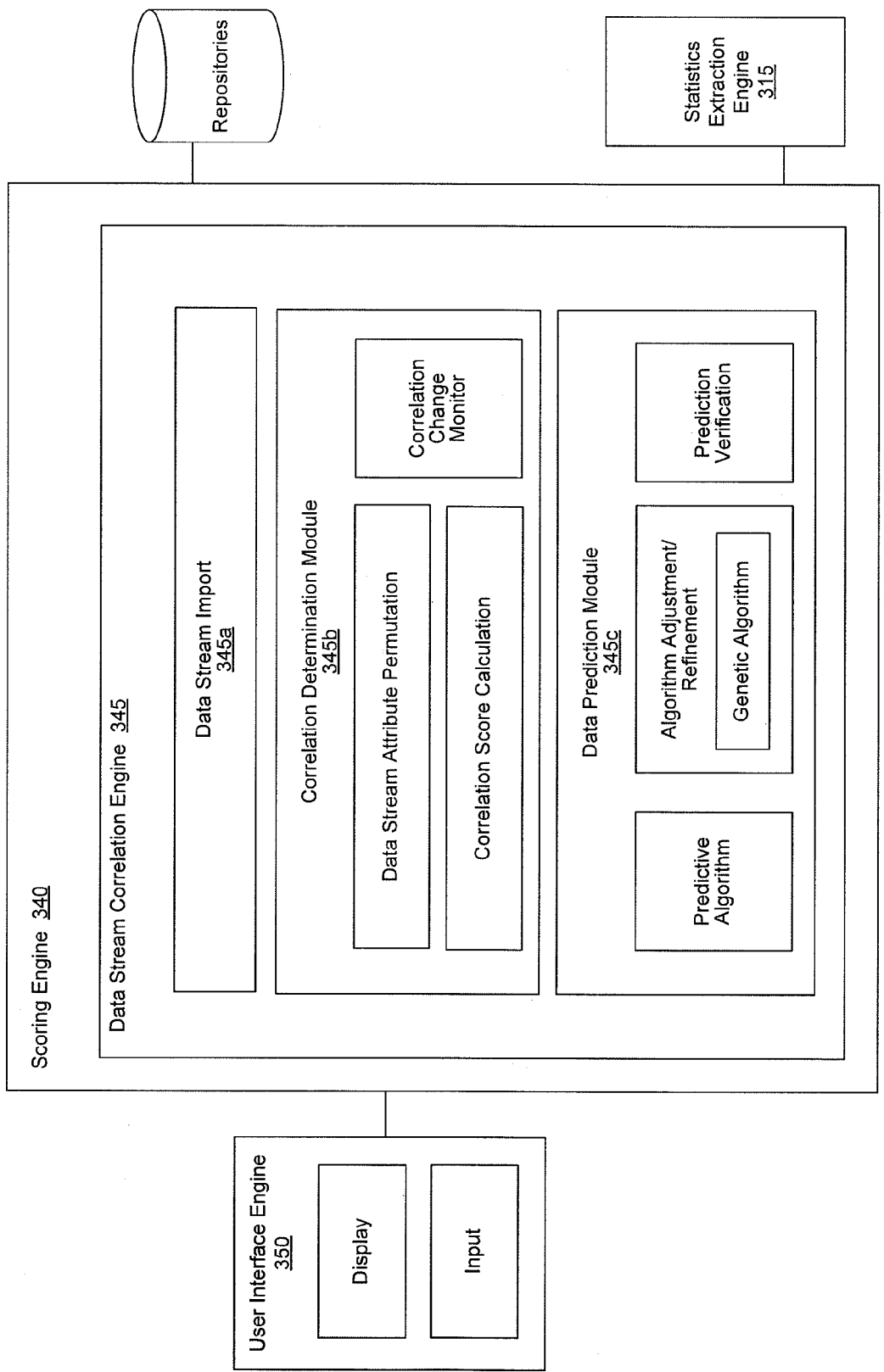
FIG. 3D depicts an additional or alternative example block diagram of the scoring engine of the host server configured to reveal correlation between data streams of activities in one or more networks to users.

FIG. 3D depicts an additional or alternative example block diagram of the scoring engine of the host server (e.g., engine 340 of host server 100) configured to reveal one or more correlations between data streams of activities in one or more networks to users.

As aforementioned, it is recognized in the present disclosure that traditional ways to analyze correlations among sets of data remain cumbersome and/or labor-intensive to unsophisticated general users and smaller companies. With the explosive amount of information that flows in on a daily basis, individuals and organizations are increasingly unable to filter signal from noise efficiently, or at all.

Accordingly, the present embodiments provide systems and methods which enable an integrated, user-friendly user experience with automated mechanisms that can reveal correlations between data streams (such as business and social intelligence data) to the users in a clear and easily understandable way, thereby enabling the users to easily digest the vast amount of information contained in activities within one or more network, to understand the correlations among the activities, to stay informed and responsive to current or new trends, and even to predict future trends.

In general, the disclosed systems and methods can examine any kind of data signal from any kind of data. In one particular example, social signal for the social intelligence data can be examined. However, it is noted that the disclosed systems and methods are not limited to "social intelligence" as input. In other variations, a stream of data from "broadcast intelligence" (e.g., what are said or discussed on broadcast television or radio) can be compared by the disclosed systems just as those data from social networks (e.g., Twitter). One or more of the present embodiments can import any two or more streams of data and correlate all combinations of attributes of the data signals contained in each stream, even if the data is numeric or of an unknown type. In some examples, the system can process a variety of signals of particular interest to a customer, such as "engagement rate", "influence", a user's gender, network, ethnicity, etc. Additionally, the disclosed systems can use various kinds of time series data. One example of data is business intelligence which can include, for example, weekly sales results for the customer.

An embodiment of the scoring engine 340 is shown in FIG. 3D to include, in addition or as an alternative to the modules and functionalities discussed above with regard to FIG. 3A, a data stream correlation engine 345 which includes, for example, a data stream import module 345a, a correlation determination module 345b, and a data prediction module 345c. The data stream correlation engine 345 is coupled to the host server's network interface 302 (FIG. 3A) to, for example, receive data streams or to send out notifications. The data stream correlation engine 345 can also receive analytical or statistical data from above-said statistics extraction engine 315. Further, the data stream correlation engine 345 is coupled to the user interface engine 350 (FIG. 3A) to display data, plots, or other types of analytical information, and to receive instructions from the user(s).

In order to enable a user to automatically and extensively examine the correlations between two streams of data, the data stream import module 345a can (e.g., automatically) import a first data stream from the network 106 (FIG. 1). The first data stream can include a first time series of data signals from conversations occurred within one or more social networks. For purposes of discussion herein, a social network is a web-based, computer-facilitated platform which primarily provides services for their users to build or maintain social relations with other users. Examples of such social network include Facebook, Google+, Twitter, and so forth. Depending on the embodiments, the data source for the first data stream can be predetermined or can be selected by the user (e.g., in a set-up phase) so that the data stream can be automatically imported by the data stream import module 345a during normal operations. In some embodiments, the data source can be reconfigured by the user during normal operations as well. Also, it is noted that the data source need not be just social network source; the data source can be any type of data source, such as a television network, a publication or data provider, a social network, an enterprise data source, or a premium data source.

Further, the data stream import module 345a can (e.g., either automatically or manually) import a second data stream (from the network 106 (FIG. 1)) for correlation analysis as well as other suitable purposes discussed herein. The second data stream can include a second time series of data signals from a user selected data source. The user selected data source can be any suitable time series data. In some embodiments, the second data stream may be another social signal. Other examples of the second data stream include sales figures for a product, stock prices for a company over time, polling results (e.g., in a political or commercial campaign), website statistics, and the like. In some variations, the second data stream can be any two-dimensional array (as opposed to a time series data). For illustration purposes, one example of a time series data can be in the format of "(time, data);" one example of a two-dimensional array can be in the format of "(data1, data2)."

It is noted that data stream correlation engine 345 can handle any number of streams. The data stream correlation engine 345 can combinatorially increase (e.g., by employing the data stream attribute permutation module, further discussed below) the number of correlations to run to find the best correlated sets of attributes within them.

In accordance with the present embodiments, each of the data streams includes a plurality of attributes which categorize a corresponding data stream's total volume. In other words, data stream can include attributes that are suitable for categorizing the data, and each data stream does not necessarily have the same attributes. For example, the first stream may include the volume of conversation with one or more particular attributes, such as a volume of how many conversations are with positive (or negative, neutral, slightly positive, slightly negative, etc.) sentiments for a particular topic in a social network. In some embodiments, the topics contained in the conversations may be based on tags (e.g., hashtags or other labeling mechanisms), metadata, etc. In one variation, the topics contained in the conversations may be automatically recognized using one or more aforementioned modules (e.g., message analysis engine 330 in host server 300). Other examples of attributes which categorize the first data stream of conversations in social networks include engagement rate (e.g., how many users interacted with corresponding data signals), users' gender, the source of social network, the ethnicity of the users who generated corresponding data signals, volume of followers, male/female ratio, retweet count, and so forth. In some embodiments, the attributes can include analytics (e.g., scores, or ranks) from third-party service providers (e.g., a "Klout Score"). In various embodiments, the attributes can include a volume of users from a given network source. For example, the attributes can include the volume of people from a network that mentioned something, which may or may not be a distinct attribute separate from the "follower" attribute depending on the implementation.

Figure 13:
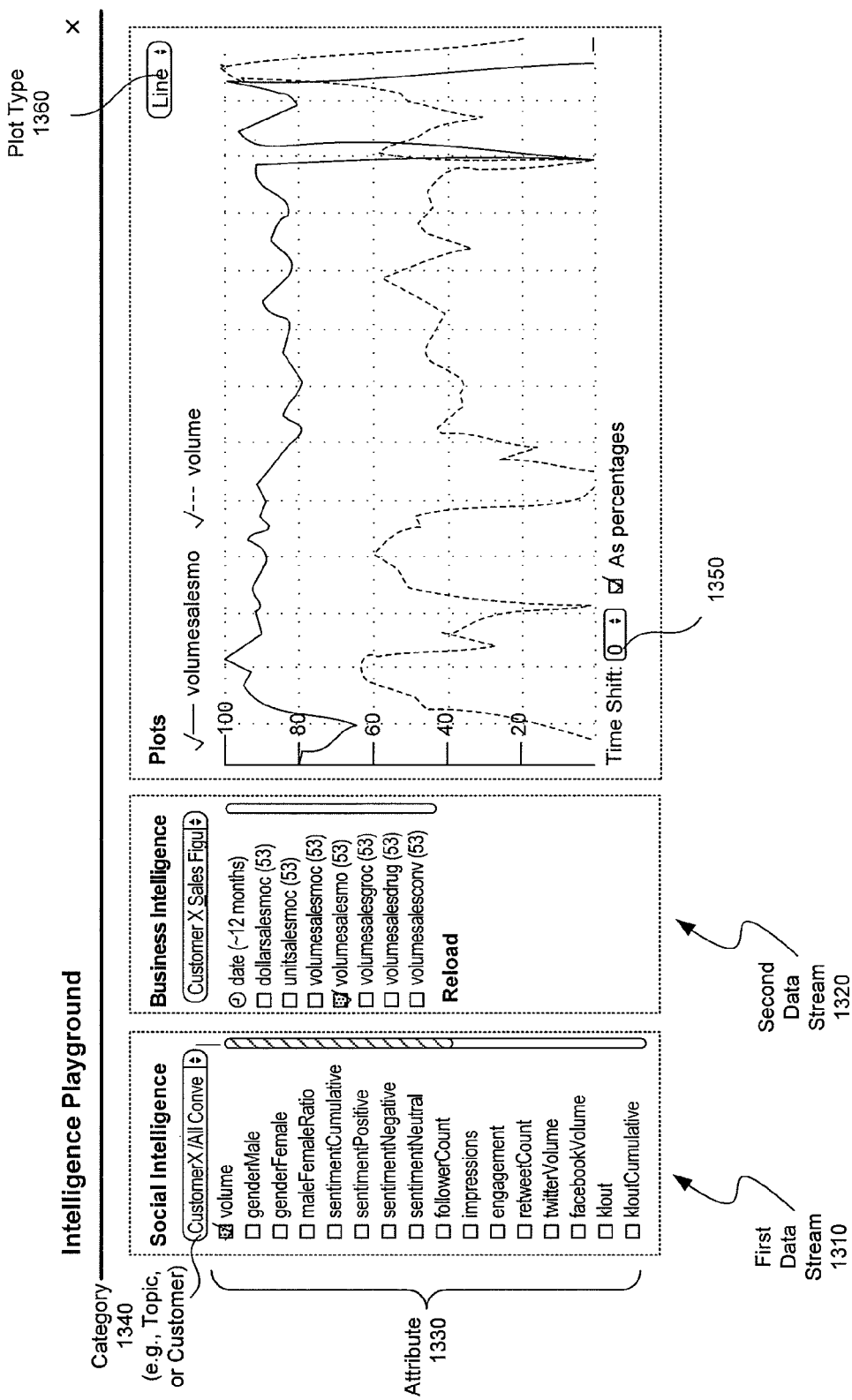
FIG. 13 depicts an example initial interface which the host server can enable users to select data stream and attributes therein for revealing (e.g., by displaying) correlation between data streams in networks to a user.

An example initial interface which the host server can enable a user to select data stream and attributes therein for revealing (e.g., by displaying) correlation between data streams in networks to a user is depicted in FIG. 13. In the embodiment depicted in FIG. 13, the first data stream 1310 contains social intelligence (e.g., from social networks) and the second data stream 1320 contains business intelligence (e.g., from a company's sales database). Besides the aforementioned attributes (e.g., attributes 1330 in FIG. 13), in some variations, the data streams can have suitable categories 1340 (e.g., topics, or customers) from which the user can select.

According to one or more embodiments, after the data streams are imported, the attributes (e.g., attributes 1330) associated with the data streams are listed for the user to select. In response to the user's selection of one or more attributes of a respective data stream, the data stream correlation engine 345 can display (e.g., via the user interface engine 350) data signals which correspond to the selected attributes using a time series plot on the user interface such as one depicted in FIG. 13.

Figure 14:
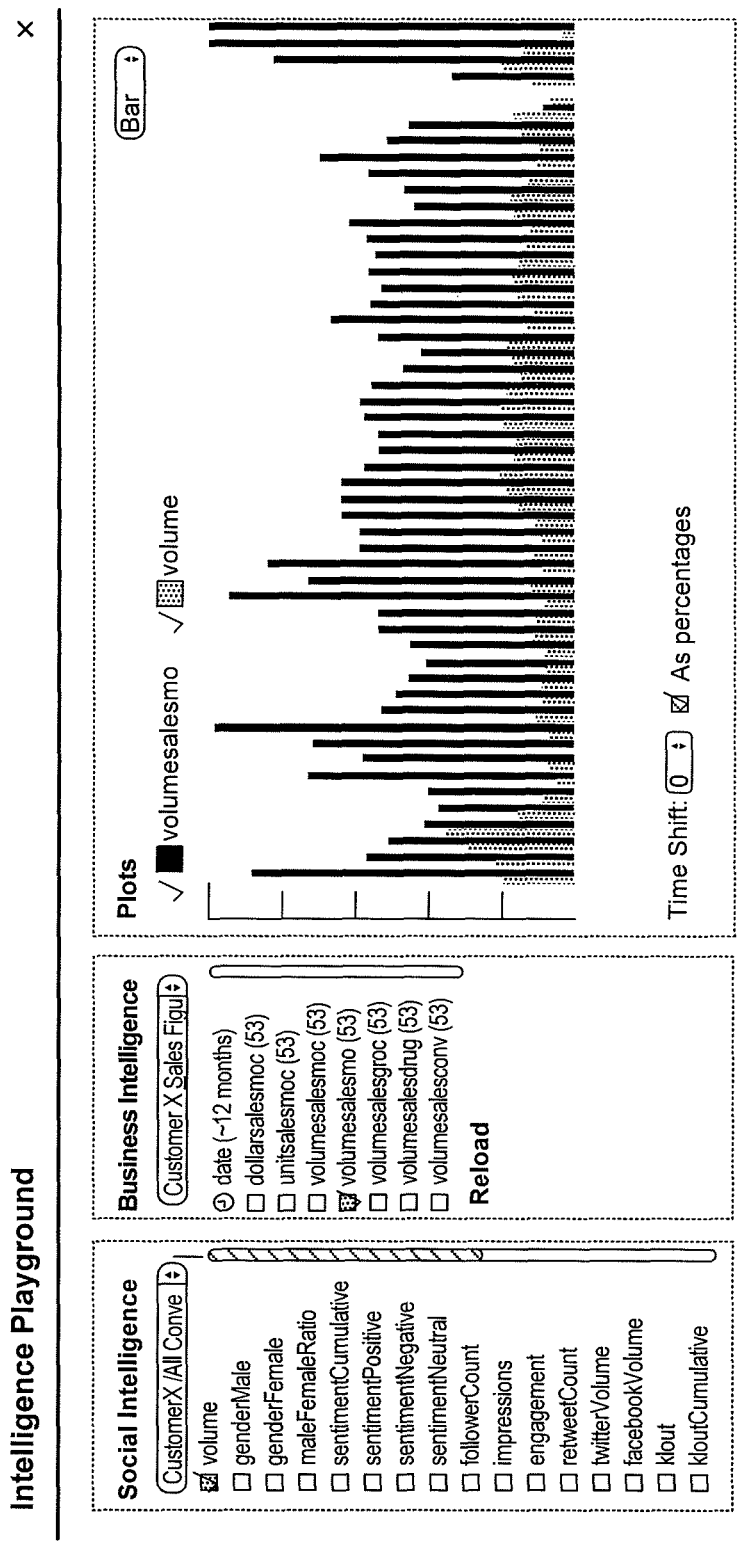
FIGS. 14-15 depict two example interfaces which are variations of the interface of FIG. 13.
Figure 15:
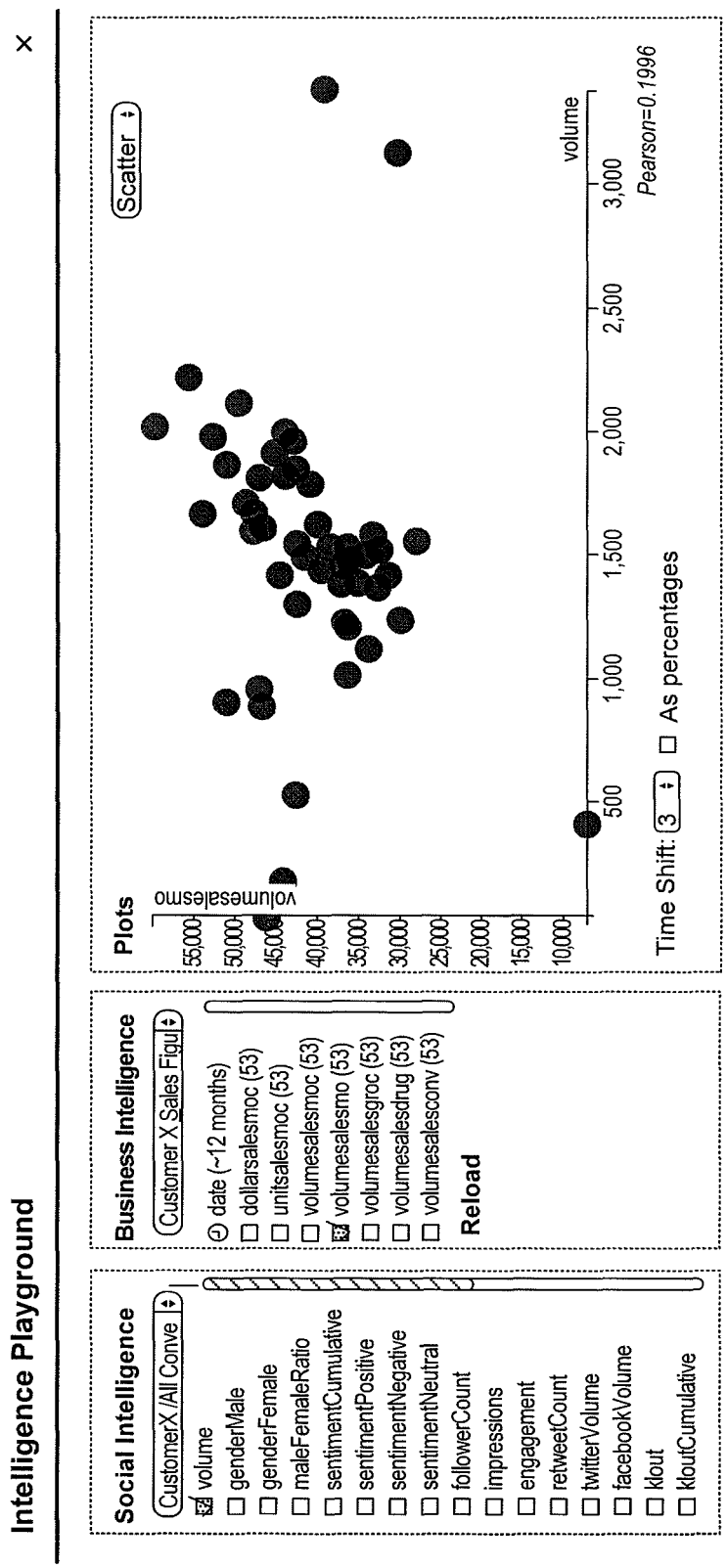

In some examples, the user can change the type of plot being displayed by selecting the plot type button 1360. Two example interfaces which are variations of the interface of FIG. 13 are depicted in FIGS. 14-15. For example, in addition to the line graph as depicted in FIG. 13, a bar graph or a scattered plot can be used to display the data signals corresponding to the selected attributes, such as respectively depicted in FIGS. 14-15. In some additional examples, the amount of time shift can be selected (e.g., by selecting the time shift button 1350). For example, a 3-day time shift can be employed (e.g., as shown in FIG. 15), though the time shift can be any suitable amount of time. Additionally, the user can choose, via the user interface, whether the data signals are to be displayed in their absolute values or in percentages.

Figure 16:
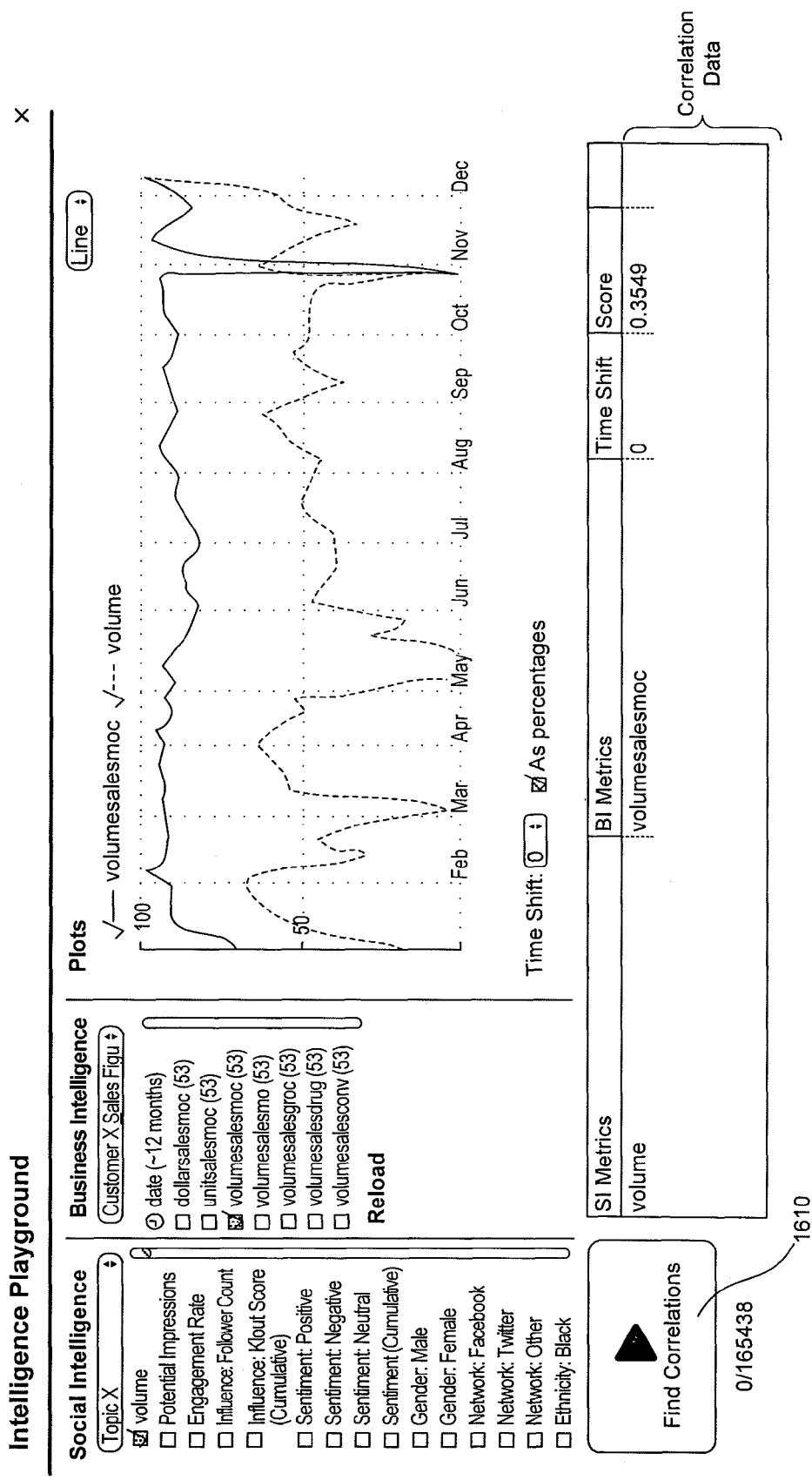
FIG. 16 depicts an example interface which the host server can reveal the automatically determined correlations between data streams in networks to a user.

Turning to FIG. 16, an example interface with which the host server (e.g., host servers 100, 300) can reveal the automatically determined correlations between data streams in networks to a user is depicted. After at least two attributes (e.g., each from one data stream) are selected, a correlation button 1610 can be displayed on the user interface. Various embodiments allow for manual testing or automatic testing to determine correlations between the two streams. In FIG. 16, the lower area of the user interface is shown to include the correlation button 1610 for automatically finding correlations. In other variations, the correlation button 1610 can be omitted, and the correlation determination module 345b can automatically employ (e.g., upon enough attributes being selected) the data stream attribute permutation module and the correlation score calculation module to perform aforesaid functionalities in determining correlations between the data streams.

More specifically, the correlation determination module 345b can include a data stream attribute permutation module, a correlation score calculation module, and a correlation change monitor module. In one embodiment, upon the user selects the correlation button 1610, the correlation determination module 345b can determine correlations between the data streams. According to some embodiments, the correlations are based on correlation scores, which are calculated by the correlation score calculation module for each correlation between (1) each selected attribute in the first data stream and (2) each selected attribute in the second data stream. One or more embodiments provide that the most relevant correlation be the highest correlation between a set of different correlation methodology. For example, the correlation determination module 345b can compare linear correlations (e.g., Pearson correlation), nonlinear correlations, linear and nonlinear moving-average, filtered metrics, and/or any combination of above to find the highest correlation.

In some implementations, the data stream attribute permutation module can automatically calculate different combinations of selected attributes between the first and second data streams, for example, so as to enable a comprehensive and exhaustive approach to correlation discovery. The correlation score calculation module can employ any suitable correlation calculation algorithm. The correlation score calculation module can also go through permutations of, e.g., the dimensions, metrics, and time shifts, to identify a relevant correlation. The results (e.g., correlation scores, attributes associated with the scores, or other correlation data) of the correlation determination may be outputted in the lower table and can be ordered by correlation score. In one example, the correlation scores are displayed adjacent to their respective attributes on the user interface to enable the user to easily understand the discovered correlations.

In some embodiments, the correlation calculation algorithm(s) employed by the correlation score calculation module can be re-selected, re-configured, fine-tuned, or otherwise adjusted for better correlation determination results. In certain embodiments, the correlation determination module 345b can direct the correlation score calculation module to (e.g., exhaustively, or periodically) test a variety of different correlation methods, or different statistical algorithms, to find correlations or other patterns of connections between the data streams. In some embodiments, the correlation determination module 345b may perform continuous real-time (or near real-time) testing of stream correlations as data continues to flow in from the data stream import module 345a. In some embodiments, the correlation determination module can also factor in other suitable metrics, such as an average influence score for users who interacted, the volume of mentions by users in each geographic region, the volume of mentions by users in different demographic segments, the volume of mentions by users in different psychographic segments, and so forth.

Figure 17:
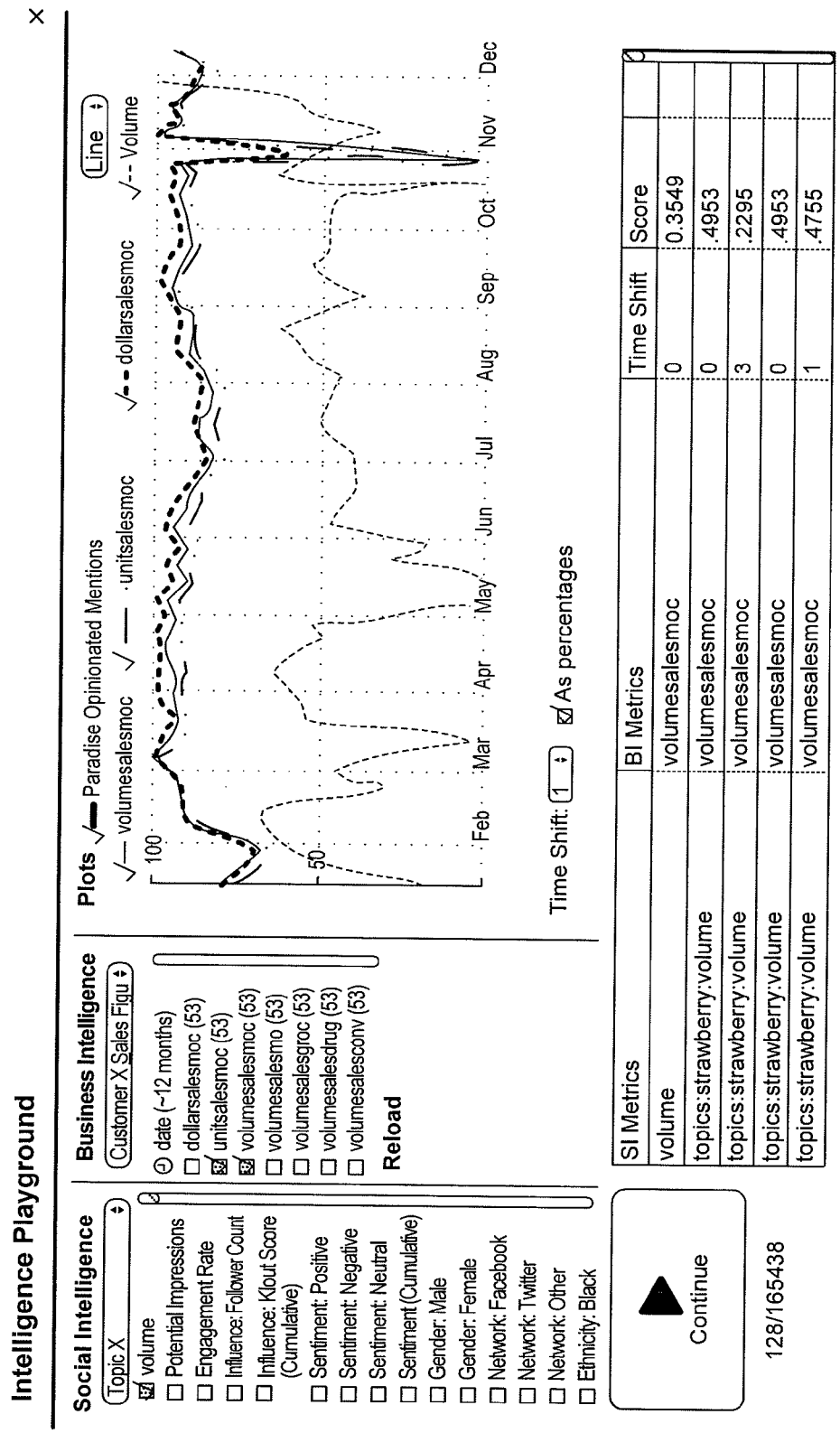
FIG. 17 depicts additional details of the example interface of FIG. 16 where multiple attributes can be selected within the same data stream.
Figure 18:
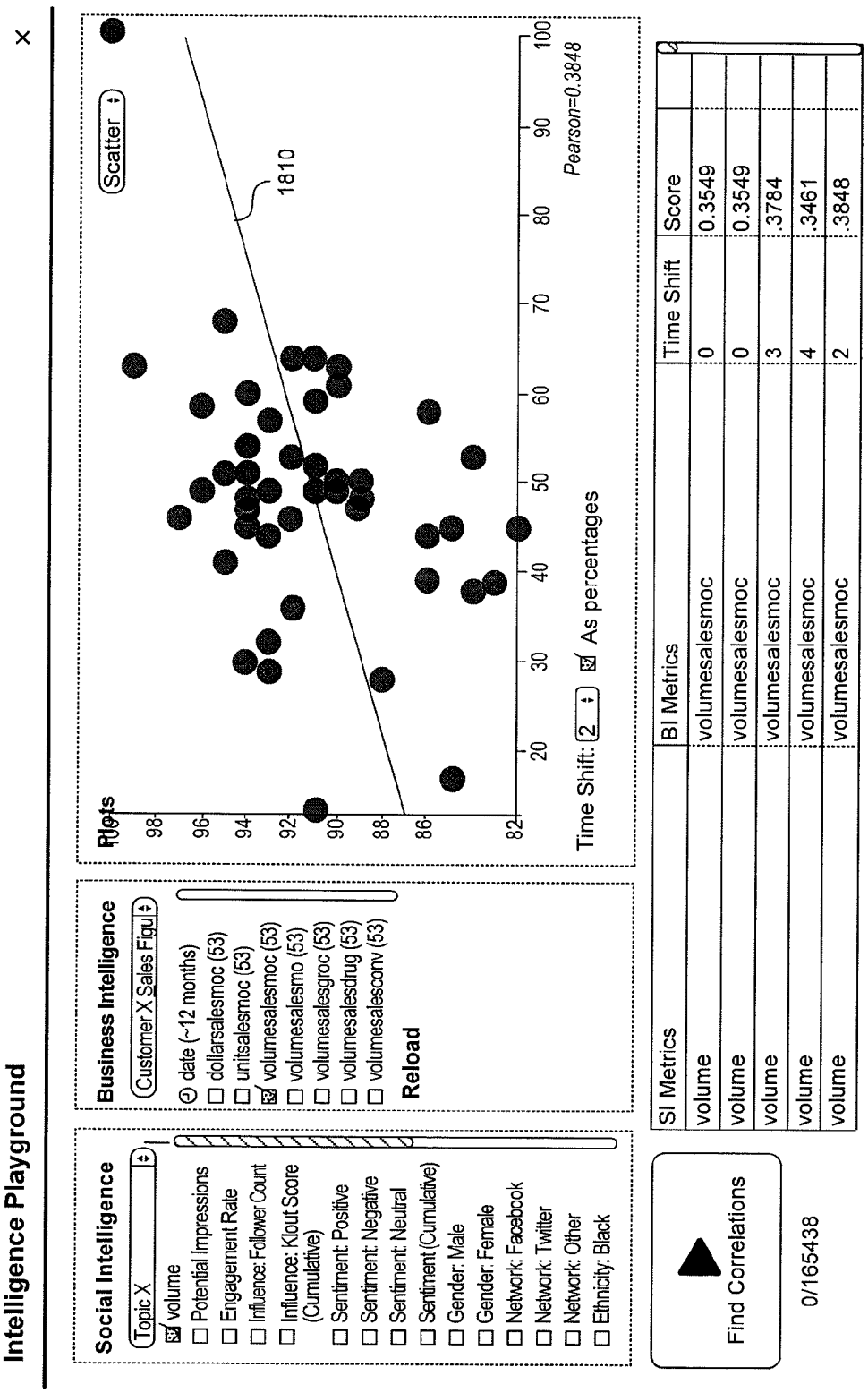
FIGS. 18-19 depict two example interfaces which are variations of the interface of FIG. 16.
Figure 19:
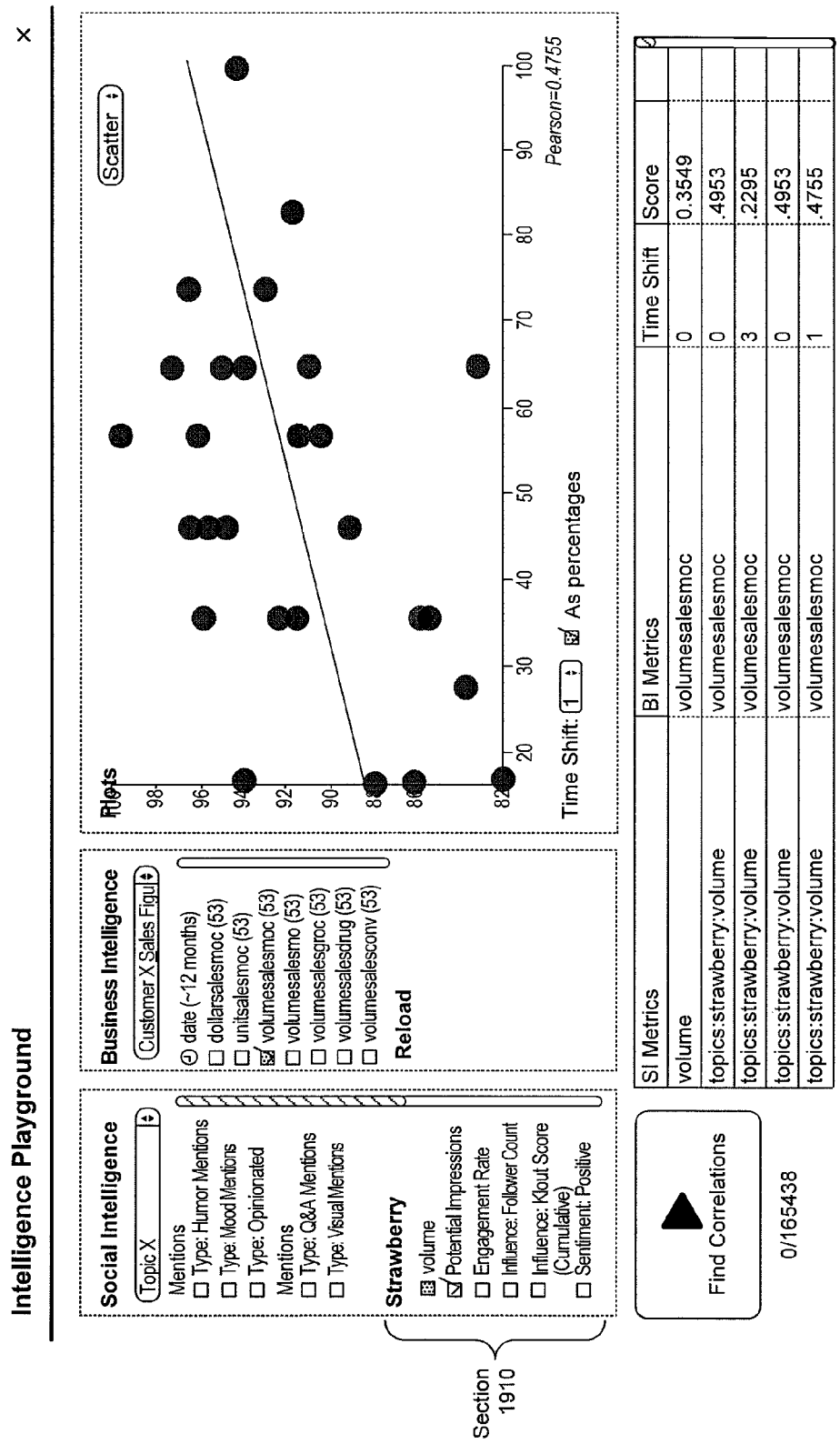

In other embodiments, the correlation determination module can include various enhancements to improve certain functional aspects. For example, some variations of the data stream correlation engine 345 can examine correlations between more than two streams (e.g., by having support of multiple stream import capabilities from module 345a). In this way, the engine 345 can reveal correlations (and predictions, details of which described below) of multiple attributes in data streams in a way that is the most sensible and of the most interest to the user. For example, in one implementation, the correlation determination module 345b can determine if (1) the volume of people having a connectivity metric and (2) the volume of positive sentiment correlate with (3) stock price. Additional details of the example interface of FIG. 16 where multiple attributes can be selected within the same data stream (e.g., in ways described above) is shown in FIG. 17.

Additionally, when a correlation is found, the correlation determination module 345b may also (e.g., automatically or manually) flag the correlation using the correlation change monitor module. In some embodiments, the user can decide whether to add the flagged correlation to the user's dashboard (e.g., where correlation information as well as other data intelligence can be summarily displayed to the user, one example being the user interfaces shown in FIGS. 13-19) and/or to receive alerts concerning the flag. For example, having identified and flagged a correlation between two streams, the correlation determination module 345 can employ the correlation change monitor module to monitor subsequently received data signals from the data streams to detect whether the determined correlations are affected.

In one example, when the subsequently received data impacts the value of the correlation (e.g., by a predetermined degree or percentage, or by exceeding a certain threshold), the correlation change monitor can perform one or more actions in response. For example, the correlation change monitor can provide a notification (e.g., a text message, an email message, a push notification, a system notification, etc.) to the user.

In variations, certain of these flagged correlations can be used, for example, to find potential leading indicators where social signals are predictive of changes in stock price, or amount of sales, etc. Flagged correlations can also be used to show whether the money spent on social marketing is causing any desired change or delivering a desired return on investment (ROI). Additionally or alternatively, flagged correlations can be used to track how sales or stock price exerts influence on social activity on various topics. In another example, flagged correlations can be used to track how social conversations about a first particular topic influence social conversations concerning a separate, second topic. Once these relationships are identified, they can be used to create alerts, early-warnings, or other analytics/predictive services.

According to one or more embodiments, correlations can be flagged between different social metrics to find predictive connections. For example, a company can use one or more social metrics to find out which demographic, social activity (e.g. by monitoring sentiments), or topic (e.g. by monitoring hashtags) increases the overall visibility of the brand.

Furthermore, a brand can use a flagged correlation between a sub-stream and a mainstream to find out which of its sub-streams is a driving force for the overall brand (e.g. a smaller brand's effect on the company as a whole). Additionally or alternatively, the correlation determination module 345b can perform correlation determination between the brand and sub-streams of the campaigns which the brand has, for example, to distinguish successful campaign from unsuccessful ones. This technique can be especially useful in situations, for example, where a campaign around one sponsored celebrity has a high correlation with the brand, while a campaign with another sponsored celebrity does not have a significant correlation with the brand.

Flagged correlation can also be used to monitor one brand's activities versus other brands' activities to reveal a more insightful understanding of the intricacy of these activities on the brand. For example, a brand can use the correlation determination module 345b to identify activities in competitors' social media that bring a positive or negative effect on their brands. Similarly, the correlation determination module 345b can reveal how the activities in other industries can have an effect on their brand (e.g. to determine whether an increase (e.g., of certain attributes) in the food industry can have an effect on a soft drink brand).

The data prediction module 345c can include, for example, a predictive algorithm module, an algorithm adjustment/refinement module, and a prediction verification module. In particular, the data prediction module 345c can employ a predictive algorithm to predict a future trend of the second series of data signals in the second data stream based on the determined correlation. For example, in FIG. 17 where one variation of the interface of FIG. 16 is displayed, a prediction line 1810 can be depicted with the plot. Also, some embodiments of the data prediction module 345c can apply machine learning mechanisms to evolve or refine predictive algorithms for a set of streams based on the identified correlations. In some embodiments, the predictive algorithm can produce predictions based on the correlations, and then the prediction verification module can test those predictions in real-time or near real-time. In one example, the prediction verification module verifies the prediction by comparing the predicted future trend with real data signals as the real data signals arrive from the second data stream.

In addition, to enhance or improve the accuracy of the predictive algorithm, the data prediction module 345c can adopt one or a combination of suitable processes including, for example, filtering, clustering, dimension reduction, numerical transformation, curve/model fitting, statistical inference, and change of space basis.

In accordance with some variations, the algorithm adjustment/refinement module can use the delta between expected and actual results in a feedback process to refine the predictive algorithm. That is to say, the algorithm adjustment/refinement module can automatically adjust the predictive algorithm based on results from the verification. Further, certain implementations of the algorithm adjustment/refinement module can adopt unsupervised machine learning mechanisms to govern or administer the algorithm adjustment. For example, one variation of the algorithm adjustment/refinement module can employ a genetic algorithm or other supervised or unsupervised machine learning approach, statistical classification, and/or regression analysis. Some examples of machine learning approaches include: neural networks, Bayesian networks, Bayesian classifiers, decision trees, Gaussian process regression, support vector machines, regression analysis, hidden Markov models, data clustering, vector quantization, K-means algorithm, fuzzy clustering, deep learning algorithms, and so forth.

It is noted that the first data stream being social signals for one particular topic as depicted in FIGS. 13-19 is merely one illustrative example. Working together through various (e.g., feedback) mechanisms discussed herein, embodiments of the data stream correlation engine 345 can perform testing on a variety of potential signals, for a variety of potential topics in the first data stream, until a collection of signals is found that correlates well with the target data in the second data stream. In some embodiments where several correlations are found, the correlation determination module 345b and the data prediction module 345c can perform further analysis to determine which of the several correlations are most correlated and predictive of changes to the second data stream.

FIG. 4A illustrates an example entry 400 in a user analytics repository. An example entry 400 can include a user identifier 402 (user name, real name, logon name), demographic information including age 404 and/or other information, an identification of registered media sites 406, influence score of the user 408, for example. The entry can also include the interest profile 410 of the user represented by a list of topics/concepts which can include ideas, products, services, people, sites, or any other entities. In one embodiment, the list of topics/concepts can be weighted to indicate relative level of interest of the user in each of the represented topics/concepts.

FIG. 4B illustrates an example entry 430 in a message analytics repository. The example entry 430 can include, an identification of the message 432, the action type 434 relating to the message, the user who acted on the message 436, an identification of the media platform 438 through which the action was generated, an original content source 440, and/or the analytics 442 associated with the message 432. The analytics can include, for example, metadata, annotations, URL metadata (metadata from cnn.com), and/or an identification of similar messages with may represent reposts. The analytics can be derived or generated by the host system shown in the example of FIGS. 3A-3B. The analytics can also be derived or generated by hosted components residing on the client side, or in any part contributed by end users, consumers, or other third party entities.

FIG. 4C illustrates a table 450 showing various configuration settings in a semantic rules set.

The semantic rule set can be specified to configure assistants to customize media content/messages or activities from one or more media sources (e.g., social media sites or platforms) to be optimally presented for various applications. For example, one assistant can be configured to aggregate and show all posts across multiple media sites by a popular figure (e.g., Mitt Romney), one assistance can be configured to show all posts on Twitter relating to an entity (e.g., the Boston Celtics, or the World Trade Center site) in a given time frame, assistants can also be configured to filter and show content relating to certain users or posted/acted on by certain users (e.g., select users who are members of a group or certain select users that specified according to some other criteria).

Multiple assistants can be created from different rule sets such that multiple content or message streams are generated for different applications. Each rule set can implement one or a combination of conditions (e.g., as shown in sets 452, 454 an 465), and when the condition(s) are met, any number of the actions x 458 can be performed.

The action x can include, for example, any number of such actions as: show me the message in a particular view or stream, adjust the relevance or visibility of the message, play a specific sound, alert me by email, alert me by SMS, generate a desktop alert, highlight the message, automatically annotate or tag the message, repost the message, delete the message, hide the message, file the message, reply to the message, translate the message, change the personalization score of the message, save the message, add the message to my interests, add the author of the message to my interests, share the message, launch a plug-in or another application, call a function, send the message to another application, export the message as data, view the message in a specific viewer, learn something from the message, etc.

Figure 5:
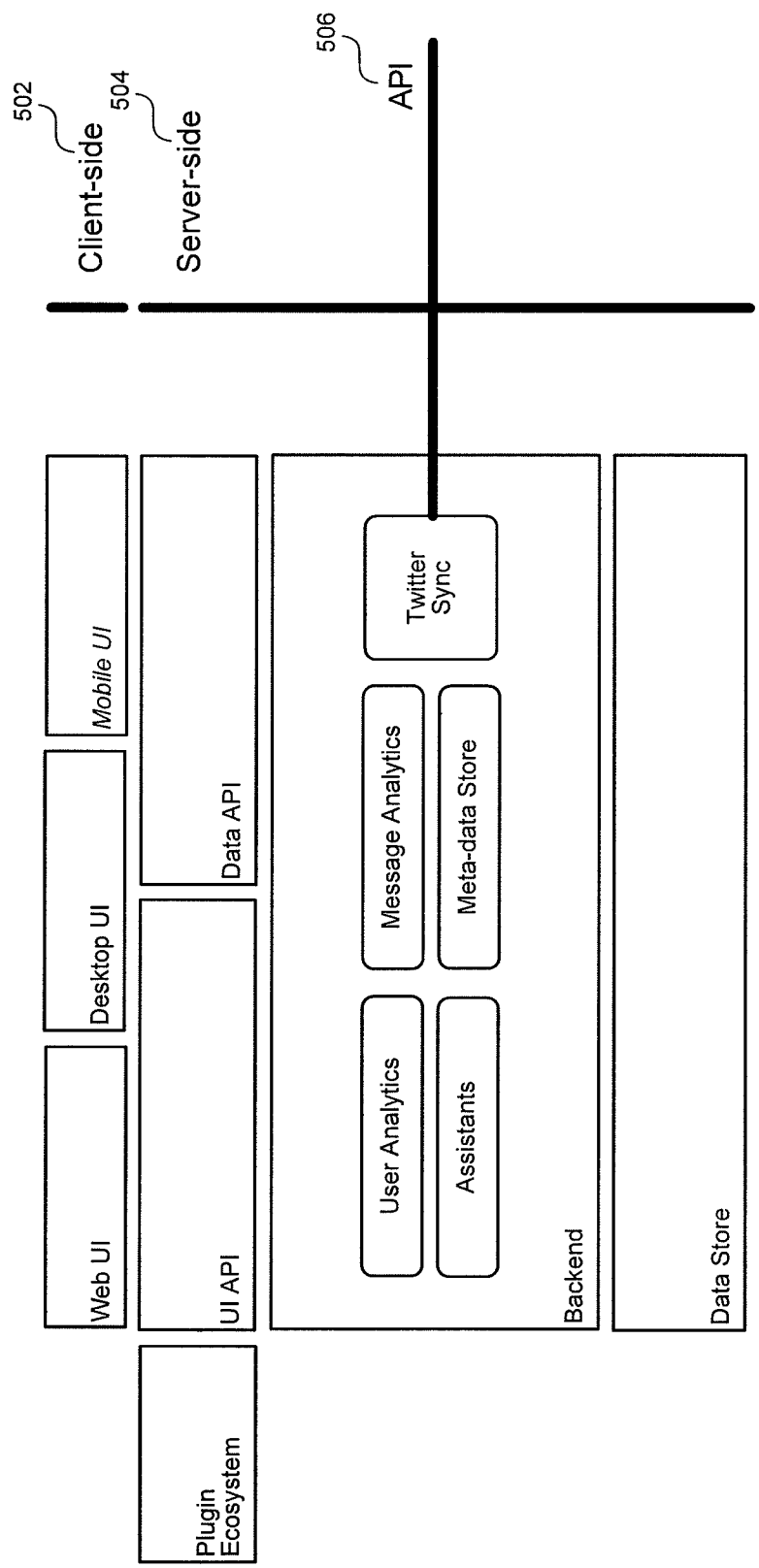
FIG. 5 illustrates an example architecture of a system which analyzes messages in a network or across networks to/from various online media sites and/or users.

FIG. 5 illustrates an example architecture of a system which analyzes messages in a network or across networks to/from various online media sites and/or users.

The system can include client-side 502 components and/or server-side components 504. The client-side components 502 which can include a single client device or multiple client devices (e.g., a single laptop or multiple laptops/servers/computers/phones/tablets or other computing devices). The client-side components 502 can also include one or more of multiple clients (e.g., the web-client, a desktop client, and/or a mobile client).

In one embodiment, a client device in the client side 502 components can determine, from the set of messages, commonly or frequently occurring topics. The client device includes an end user device such as a laptop, computer or mobile computing device (mobile phone, tablet, etc.) on the client side 502 of the architecture. The client device on the client side 502 can, for example, computes at least a portion (e.g., some or all) of the analytics for the commonly or frequently occurring topics in the set of messages that indicate respective levels of popularity which are then presented as indicators at the client device (e.g., via the user interface component) in a graphical arrangement which depends on the respective levels of popularity (via the client device). The client-side components 502 can include a user interface component which is also able to depict incoming messages/content in a stream personalized for the user with the visibility of those messages which are more interesting enhanced.

Furthermore, the components shown on the server-side 504 (e.g., user analytics, message analytics, assistants, etc.) can in addition reside on the client side 502. As such, the server-side components 504 may not be needed. In some instances, other portions of the analytics used to determine the respective levels of trendiness of the commonly or frequently occurring topics is computed by other client devices (e.g., other devices, laptops, smartphones, or tablets on the client side 502), such that the computing load can be distributed across devices. By using multiple client devices to compute analytics the processing power can be increased. The client device can then with the other client devices to obtain the other portions of the analytics used to present the indicators at the client device.

In one embodiment, crowd-based cloud computing is implemented in that the processing is performed in web browsers (e.g., including but not limited to Google Chrome, Firefox, Opera, Dolphin, Internet Explorer, and/or various mobile browsers) at one or more client devices on the client-side 502. As such, in this instance, each user device becomes a part of the computing architecture without requiring any additional software or plug-in installations. In one embodiment, the other portions of the analytics computed by other client devices are stored at a server (e.g., on the server side 504) and the client device communicates with the server 504 to obtain the other portions of the analytics used to present the indicators at the client device.

Note that a server on the server side 504 is capable of computing any or all of the analytics of the commonly or frequently occurring topics though it need not do so. For example, the computing of any or all of the analytics of the commonly or frequently occurring topics can be dynamically adjusted between the server side 504 and the client. In one embodiment, the computing of the analytics of the commonly or frequently occurring topics can be automatically shifted to the server if the client device goes off line or malfunctions.

The computing can automatically shift back to the client device when the client device goes back online. In some instances, the client device on the client side 502 can transmit the analytics to the server-side 504 components for storage or additional processing, and/or for subsequent use by other client devices. The analytics and messages/content can be stored on the server-side 504 at the data store.

Figure 6:
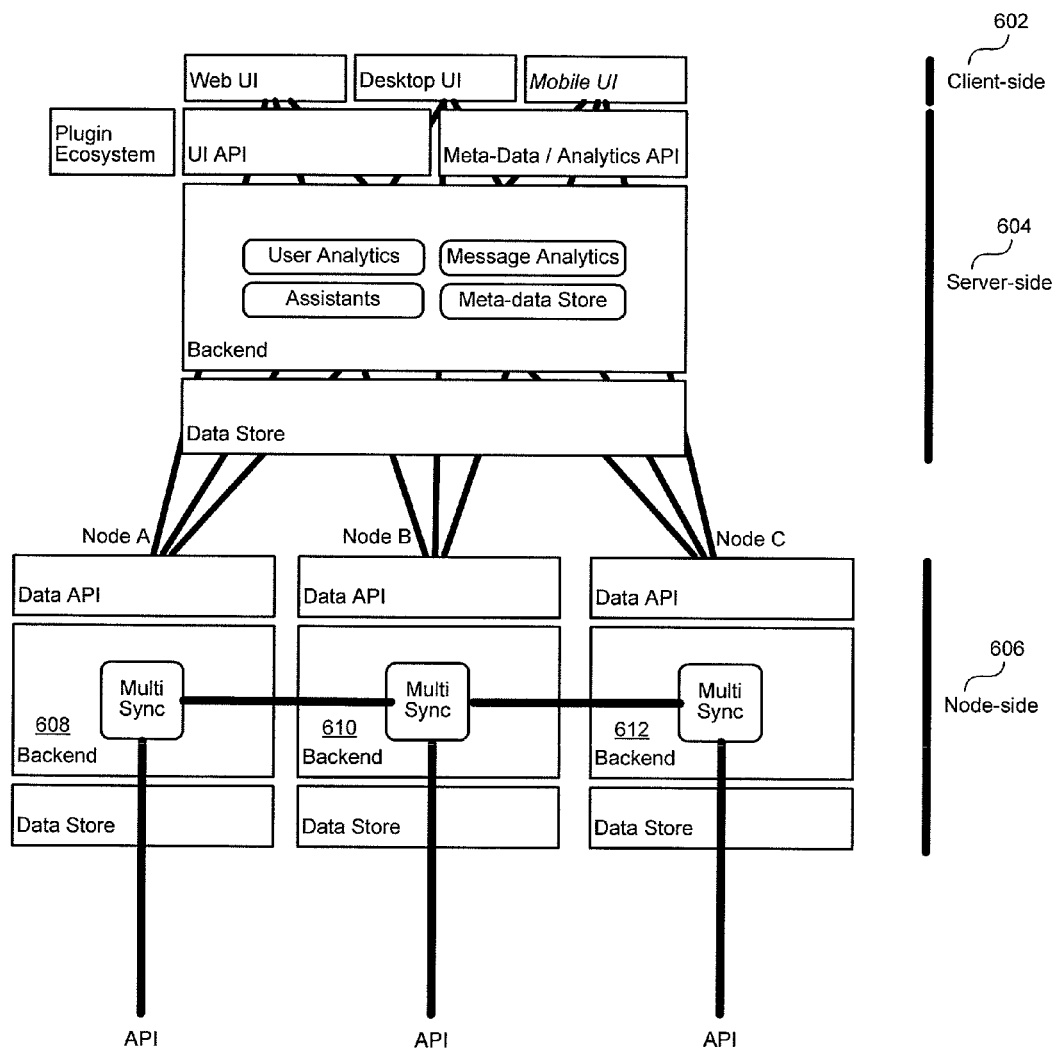
FIG. 6 illustrates another example architecture of a system which analyzes messages in a network or across networks to/from various online media sites and/or users.

Note that in general, the server-side 504 component can also include multiple servers or multiple nodes for further load distribution and redundancy purposes, as shown in the following example of FIG. 6. FIG. 6 illustrates another example architecture of a system which analyzes messages in a network or across networks to/from various online media sites and/or users.

In the example architecture of FIG. 6, the server-side 604 component includes or is distributed into multiple nodes on shown as node-side components 606. In this example, one or more servers on the server side 604 can determines interests of the user from online activity of the user at the online media services and increases visibility of those incoming messages which are more interesting to the user among other incoming messages in the stream for presentation in a user interface.

In one embodiment, the online activity of the user can be automatically detected at multiple nodes on the node side 606 coupled to the server side 604, each of which able to query one or more of the online media services (e.g., Facebook, Linkedin, Twitter, Quora, Yammer, etc.). In some instances, two or more multiple nodes can be coupled to each other such that external services can be queried or accessed in redundancy in case any of the nodes are banned, malfunctions, or needs servicing. In general, the multiple nodes of 606 can query external APIs of the online media services to access the messages/content and/or user activities.

In some instances, different nodes are assigned to different sets of users in the multiple users. For example, a given node creates or extracts metadata from the incoming messages for use analyzing the incoming messages for those users who are assigned to the given node. The given node can further analyze the incoming messages for its assigned users. In one embodiment, the personalized message streams are stored at the different nodes based on user assignment. Different nodes can be assigned to different sets of users in the multiple users but with redundancy. The user interface components on the client side 604 of can be coupled to the multiple nodes and are able to depict the personalized messages streams stored on the multiple nodes on the node side 606.

In one embodiment, a server on the server side 604 is able to analyze the incoming messages for the users and generate message analytics. The server on the server side 604 can also generate user analytics from the online activity of the users at the online media services; where, the online activity of the user includes user interaction with content on or via the social networking services. For example, the server side component 604 can determine the interests by analyzing user content provided in the online activity at or via the social networking service, where the user content includes user-submitted content or user-generated content including by way of example one or more of, user profiles, user events, user likes or dislikes, status updates, mentions, feeds, tweets, links, notes, video content, audio content.

The server side component 604 can determines interests of the user from online activity of the users at the online media services and increases visibility of those incoming messages which are more interesting to generate the personalized message streams. The server side component 604 can also create and/or extract metadata from the incoming messages for use analyzing the incoming messages.

Figure 7:
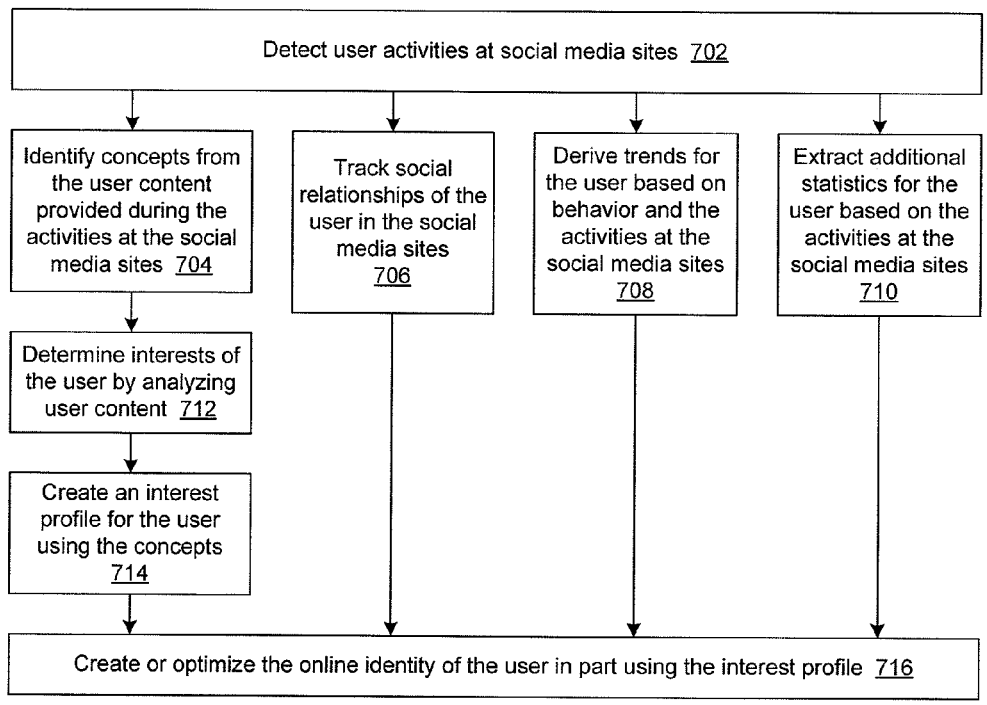
FIG. 7 depicts a flow chart illustrating an example process for aggregating an online identity of a user from activities at social media sites.

The incoming messages can be stored at the data stores or repositories distributed among the multiple nodes on the node side 606. In general, the server component 604 and the nodeside components 606 are a part of a platform which is typically independent of any of the online media services FIG. 7 depicts a flow chart illustrating an example process for aggregating an online identity of a user from activities at social media sites.

In process 702, user activities at social media sites are detected. In process 704, concepts are identified from the user content provided during the activities at the social media sites. In one embodiment, the concepts are identified using natural language processing or any other known/convenient means. In process 712, interests of the user are determined by analyzing user content. In process 714, an interest profile for the user using the concepts. In process 716, the online identity of the user is created in part using the interest profile. In process 706, social relationships of the user in the social media sites. In process 708, trends are derived for the user based on behavior and the activities at the social media sites.

In process 710, additional statistics are extracted for the user based on the activities at the social media sites. For example, the statistics can include, one or more of, a degree to which a user trusts other people on various topics, a degree to which other people trust the user on various topics, demographics information of a user, and/or social influence of the user. The additional statistics can also include, sites that the user is interested, content and products that the user is interested in, statistics about the people the user reposts or replies to, who repost or reply to the user, the people that the user is interested in. The online identify of the user can further be created/optimized using one or more of, the social relationships, the additional statistics, and/or trends determined for the user.

Figure 8:
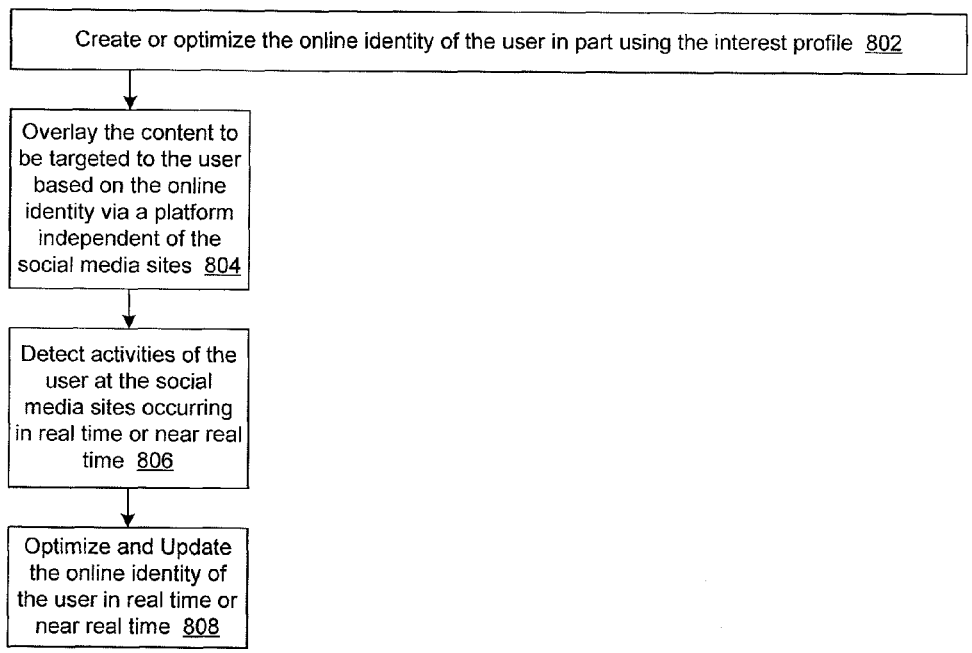
FIG. 8 depicts an example flow chart illustrating an example process for targeting content placement using online identifies aggregated a user's online activities.

FIG. 8 depicts an example flow chart illustrating an example process for targeting content placement using online identifies aggregated a user's online activities.

In process 802, which continues from FIG. 7, the online identity has been created and/or optimized from one or more of the processes of FIG. 7.

In process 804, the content to be targeted to the user is overlayed based on the online identity via a platform independent of the social media sites. The content targeted to user can be created via the platform independent of the social media sites. For example, the content targeted to the user can be created by a third party (e.g., a third party advertiser or a third party in partnership with the platform which created the online identify of the user, or a customer of the platform). In general, the content that is targeted includes one or more of, promotional content, sponsored content, advertisements, coupons, e-coupon In process 806, activities of the user at the social media sites occurring in real time or near real time are detected. In process 808, the online identity of the user in real time or near real time is optimized and updated in real time or near real time. This allows the content to be targeted based on what the user is sending messages about or what the user is posting or tweeting about, searching for, viewing, browsing, etc. The content is targeted further based on geographical locale of the user, for example as determined from user check-ins or other location sensitive devices or location based services.

Figure 9:
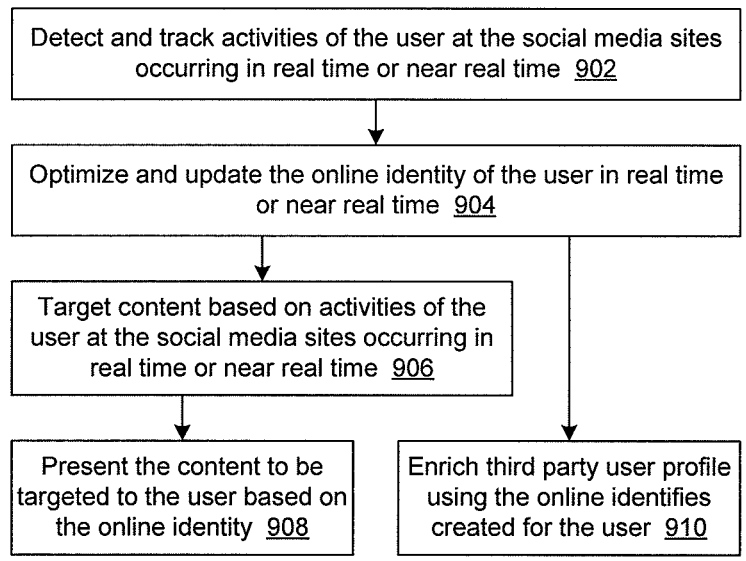
FIG. 9 depict example flow charts illustrating example processes for targeting content placement based on real time online activities of the user and enriching a third party user profile.

FIG. 9 depict example flow charts illustrating example processes for targeting content placement based on real time online activities of the user and enriching a third party user profile.

In process 902, activities of the user at the social media sites occurring in real time or near real time are detected and tracked.

In process 904, the online identity of the user is optimized and/or updated in real time or near real time.

In process 906, content is targeted to the user based on activities of the user at the social media sites occurring in real time or near real time. For example the content can be targeted based on what the user is sending messages about or what the user is posting or tweeting about in real time or near real time, or any real time activity within, across, or at various social media or networking sites/platforms. In one embodiment, trends for the user are derived based on behavior and the activities at the social media site and the online identity of the user is also created in part using trends derived for the user.

In process 908, the content to be targeted to the user based is presented based on the online identity, for example, by overlaying the content to be targeted to the user based on the online identity via a platform independent of the social media sites In process 910, third party user profile is enriched using the online identifies created for the user. The third party user profile can include, for example, third party advertiser's profiles. These profiles can be supplemented by the analysis performed by the server based on the user's aggregate online presence through their behaviors, actions, connections and other activities indicating the overall online presence across multiple sites and platforms.

The profile enrichment can include data supplementing across multiple dimensions including time (e.g., trends, most recent, over all trend, past trend), across certain topics/concepts (user's preferences regarding certain topics/concepts—for example, whether the user prefers to watch football or basketball in the topic of sports), on various platforms (what the user posts or views on Facebook vs. Twitter vs. Google+, the people that they follow and/or interact with), with respect to certain users (what they interact with certain users regarding, and/or via what platform, etc. thus enabling a third party promoter or advertiser to review potential targeted users from different aspects and identify those aspects most suitable for targeting a certain ad.

Figure 10:
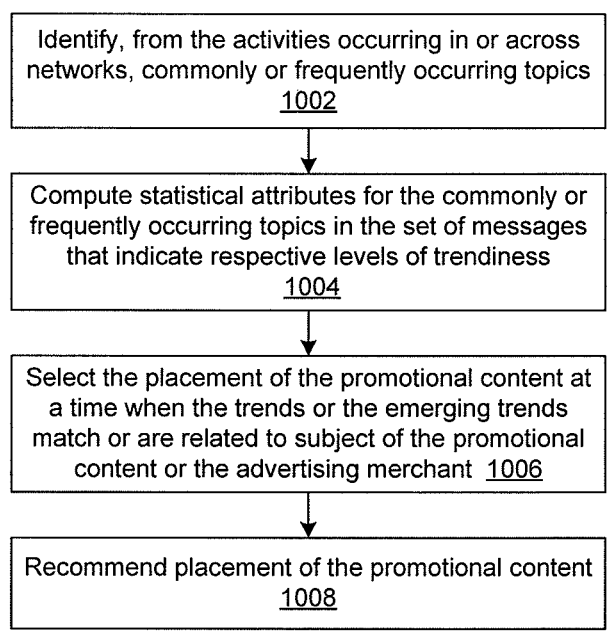
FIG. 10 depicts a flow chart illustrating an example process for recommending promotional item placement for an advertiser based on trends identified from activities occurring in or across networks.

FIG. 10 depicts a flow chart illustrating an example process for recommending promotional content placement for an advertiser based on trends identified from activities occurring in or across networks.

In process 1002, commonly or frequently occurring topics are identified from activities occurring in or across networks. In process 1004, statistical attributes are computed for the commonly or frequently occurring topics in the set of messages that indicate respective levels of trendiness.

In process 1006, the placement of the promotional content/item (e.g., advertisement) is selected at a time when the trends or the emerging trends match or are related to subject of the advertisement or the advertiser. In process 1008, placement of the advertisement is recommended.

Figure 11:
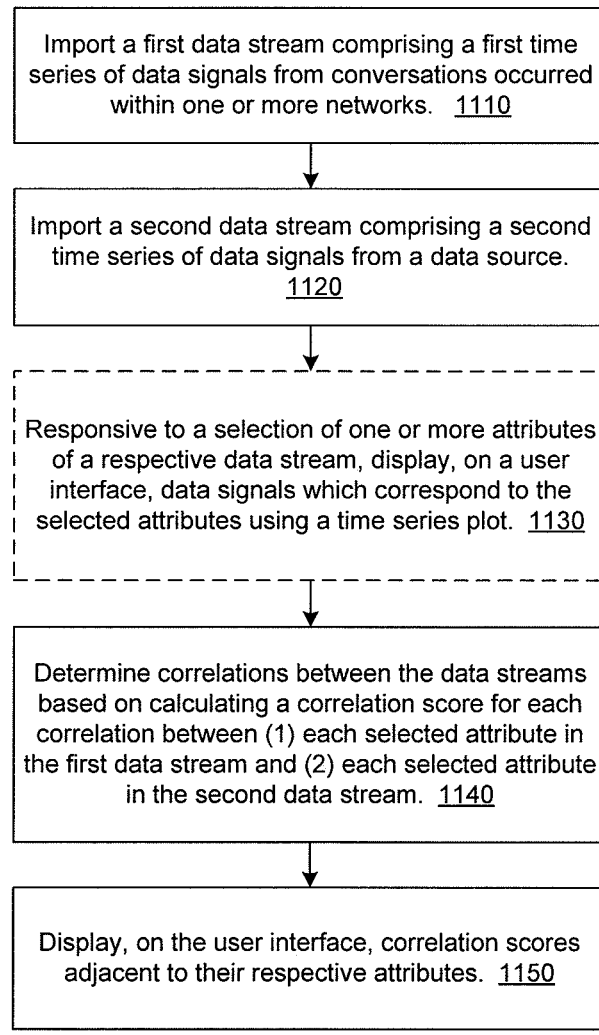
FIG. 11 depicts a flow chart illustrating an example process for revealing correlation between data streams of activities in one or more networks to users.

FIG. 11 depicts a flow chart illustrating an example process for revealing correlation between data streams of activities in one or more networks to users. The example process can be performed by, for example, the host server 300 of FIG. 3A. With additional reference to FIG. 3D, the example process of FIG. 11 is explained.

In order to enable a user to automatically and extensively examine the correlations between two streams of data, the data stream correlation engine 345 can (e.g., automatically) import (1110) a first data stream from the network. The first data stream can include a first time series of data signals from conversations occurred within one or more (e.g., social) networks.

Further, the data stream correlation engine 345 can (e.g., either automatically or manually) import (1120) a second data stream (from the network 106 (FIG. 1)) for correlation analysis as well as other suitable purposes discussed herein. The second data stream can include a second time series of data signals from a user selected data source. The user selected data source can be any suitable time series data.

In accordance with the present embodiments, each of the data streams includes a plurality of attributes which categorize a corresponding data stream's total volume. In some embodiments, after the data streams are imported, the attributes (e.g., attributes 1330) associated with the data streams are listed for the user to select. In response to the user's selection of one or more attributes of a respective data stream, the data stream correlation engine 345 can display (e.g., via the user interface engine 350) (1130) data signals which correspond to the selected attributes using a time series plot on the user interface.

In one embodiment, the data stream correlation engine 345 can determine (1140) correlations between the data streams. According to some embodiments, the correlations are based on correlation scores, which are calculated by the correlation score calculation module (e.g., in the data stream correlation engine 345) for each correlation between (1) each selected attribute in the first data stream and (2) each selected attribute in the second data stream.

The results (e.g., correlation scores, attributes associated with the scores, or other correlation data) of the correlation determination may be outputted (1150) in the lower table and can be ordered by correlation score. In one example, the correlation scores are displayed adjacent to their respective attributes on the user interface to enable the user to easily understand the discovered correlations.

Figure 12:
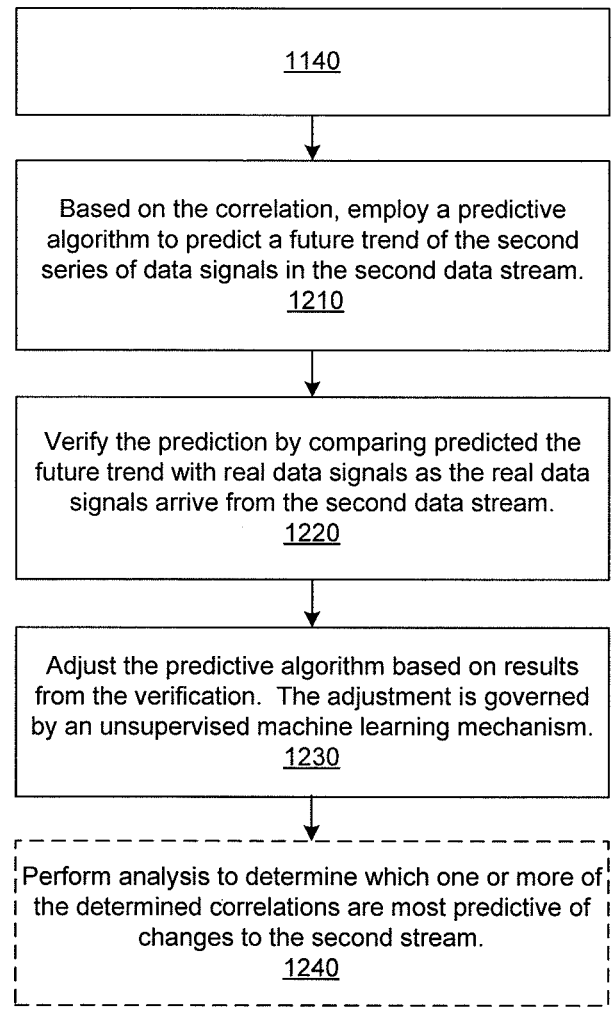
FIG. 12 depicts a flow chart illustrating additional details in the process of FIG. 11.

FIG. 12 depicts a flow chart illustrating additional details in the process of FIG. 11. The example process can be performed by, for example, the host server 300 of FIG. 3A. With additional reference to FIGS. 3D, the example process of FIG. 12 is explained.

After step 1140 explained above, in some embodiments, the data stream correlation engine 345 can employ (1210) a predictive algorithm to predict a future trend of the second series of data signals in the second data stream based on the determined correlation. Also, some embodiments of the data prediction module 345c can apply machine learning mechanisms to evolve or refine predictive algorithms for a set of streams based on the identified correlations.

In some embodiments, the predictive algorithm can produce predictions based on the correlations, and then the data stream correlation engine 345 can test (1220) those predictions in real-time or near real-time. In one example, the prediction verification module verifies the prediction by comparing the predicted future trend with real data signals as the real data signals arrive from the second data stream.

In accordance with some variations, the data stream correlation engine 345 can use the delta between expected and actual results in a feedback process to refine the predictive algorithm. That is to say, the data stream correlation engine 345 can automatically adjust (1230) the predictive algorithm based on results from the verification. Further, certain implementations of the data stream correlation engine 345 can adopt unsupervised machine learning mechanisms to govern or administer the algorithm adjustment. For example, one variation of the data stream correlation engine 345 can employ a genetic algorithm or other supervised or unsupervised machine learning approach.

The data stream correlation engine 345 can perform testing on a variety of potential signals, for a variety of potential topics in the first data stream, until a collection of signals is found that correlates well with the target data in the second data stream. Optionally, in some embodiments where several correlations are found, the data stream correlation engine 345 (e.g., via correlation determination module 345b and the data prediction module 345c) can perform (1240) further analysis to determine which of the several correlations are most correlated and predictive of changes to the second data stream.

In this way, the present disclosed embodiments of the data stream correlation engine 345 can enable a host server (e.g., host server 300) to provide users with a tool having an integrated, user-friendly interface and having automated mechanisms which can reveal correlations between data streams to the users in a clear and easily understandable way, thereby enabling the users to easily digest the vast amount of information contained in activities within one or more network, to understand the correlations among the activities, to stay informed and responsive to current or new trends, and even to predict future trends.

Figure 20:
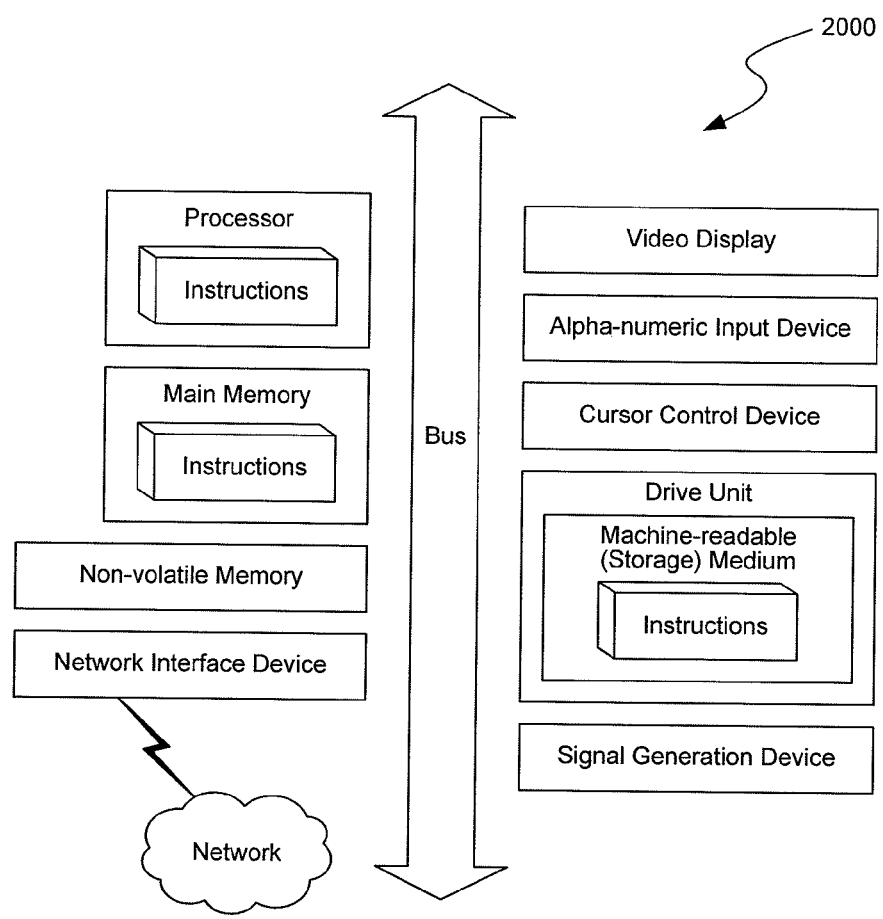
FIG. 20 shows a diagrammatic representation of a machine in the example form of a computer system within which a set of instructions, for causing the machine to perform any one or more of the methodologies discussed herein, may be executed.

FIG. 20 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method for revealing correlations in data signals, the method comprising:
   automatically importing a first data stream comprising a first time series of the data signals from conversations occurred within one or more social networks;
   importing a second data stream comprising a second time series of the data signals from a user selected data source,
   wherein each of the data streams includes a plurality of attributes which categorize a corresponding data stream's total volume;
   responsive to a selection of one or more attributes of a respective data stream, displaying, on a user interface, the data signals which correspond to the selected attributes using a time series plot;
   determining correlations between the data streams based on calculating a correlation score for each correlation between (1) each selected attribute in the first data stream and (2) each selected attribute in the second data stream,
   wherein the correlation score is calculated at least in part based on permutations of different lengths of time shifts in which the data signals take place; and
   displaying, on the user interface, correlation scores adjacent to their respective attributes.

2. The method of claim 1, further comprising:
   based on the correlation, employing a predictive algorithm to predict a future trend of the second series of the data signals in the second data stream; and
   verifying the prediction by comparing the predicted future trend with real data signals as the real data signals arrive from the second data stream.

3. The method of claim 2, further comprising:
   automatically adjusting the predictive algorithm based on results from the verification, wherein the automatic adjustment is governed by an unsupervised machine learning mechanism.

4. The method of claim 3, further comprising:
   performing analysis to determine which one or more of the determined correlations are most predictive of changes to the second stream.

5. The method of claim 3, wherein the unsupervised machine learning mechanism comprises an implementation of a genetic algorithm.

6. The method of claim 1, further comprising:
   monitoring subsequent data signals from the data streams to detect whether the determined correlations are affected; and
   performing an action when the determined correlations are affected by the subsequent data signals.

7. The method of claim 6, wherein the action comprises generating a notification to a user.

8. The method of claim 1, further comprising:
   importing a third data stream comprising a third time series of the data signals from another user selected data source.

9. The method of claim 1, wherein the one or more social networks comprise web-based, computer-facilitated platforms which primarily provide services for their users to build or maintain social relations with other users.

10. The method of claim 1, wherein the user selected data source comprises one or more of: sales results for products, stock prices for companies, polling results, website access statistics, transaction data, stock trading volume, application usage statistics, macro-economic indicators, customer support statistics, inbound call center or sales statistics, or business financial metrics for a company.

11. The method of claim 1, wherein the conversations include one or more topics, and wherein the first data stream's attributes include a volume of conversations corresponding to each topic.

12. The method of claim 11, wherein the first data stream's attributes further include (1) a volume of conversations with positive sentiments for at least one topic, and (2) a volume of conversations with negative sentiments for the at least one topic.

13. The method of claim 11, wherein the first data stream's attributes further include a volume of each gender which generated the conversations corresponding to the at least one topic.

14. The method of claim 11, wherein the first data stream's attributes further include one or more of: (1) an identity of network source; (2) a volume of users; (3) an ethnicity of users who generated corresponding data signals; or (4) a volume of how many users interacted with corresponding data signals.

15. A server which reveals correlations in data signals, the server comprising:
   a processor; and
   a memory unit having instructions stored thereon which when executed by the processor, causes the processor to:
      automatically import a first data stream comprising a first time series of the data signals from conversations occurred within one or more social networks;
      import a second data stream comprising a second time series of the data signals from a user selected data source,
      wherein each of the data streams includes a plurality of attributes which categorize a corresponding data stream's total volume;
      responsive to a selection of one or more attributes of a respective data stream, display, on a user interface, the data signals which correspond to the selected attributes using a time series plot;
      determine correlations between the data streams based on calculating a correlation score for each correlation between (1) each selected attribute in the first data stream and (2) each selected attribute in the second data stream,
      wherein the correlation score is calculated at least in part based on permutations of different lengths of time shifts in which the data signals take place; and
      display, on the user interface, correlation scores adjacent to their respective attributes.

16. The server of claim 15, wherein the processor is further caused by the instructions to:
   based on the correlation, employ a predictive algorithm to predict a future trend of the second series of the data signals in the second data stream; and
   verify the prediction by comparing the predicted future trend with real data signals as the real data signals arrive from the second data stream.

17. The server of claim 16, wherein the processor is further caused by the instructions to:

automatically adjust the predictive algorithm based on results from the verification, wherein the automatic adjustment is governed by an unsupervised machine learning mechanism.

18. The server of claim 17, wherein the processor is further caused by the instructions to:
perform analysis to determine which one or more of the determined correlations are most predictive of changes to the second stream.

19. The server of claim 17, wherein the unsupervised machine learning mechanism comprises an implementation of a genetic algorithm.

20. The server of claim 15, wherein the processor is further caused by the instructions to:
monitor subsequent data signals from the data streams to detect whether the determined correlations are affected;
perform an action when the determined correlations are affected by the subsequent data signals.

21. The server of claim 20, wherein the action comprises generating a notification to a user.

22. The server of claim 15, wherein the processor is further caused by the instructions to:
import a third data stream comprising a third time series of the data signals from another user selected data source.

23. The server of claim 15, wherein the one or more social networks comprise web-based, computer-facilitated platforms which primarily provide services for their users to build or maintain social relations with other users.

24. The server of claim 15, wherein the user selected data source comprises one or more of: sales results for products, stock prices for companies, polling results, website access statistics, transaction data, stock trading volume, application usage statistics, macro-economic indicators, customer support statistics, inbound call center or sales statistics, or business financial metrics for a company.

25. The server of claim 15, wherein the conversations include one or more topics, and wherein the first data stream's attributes include a volume of conversations corresponding to each topic.

26. The server of claim 25, wherein the first data stream's attributes further include (1) a volume of conversations with positive sentiments for at least one topic, and (2) a volume of conversations with negative sentiments for the at least one topic.

27. The server of claim 25, wherein the first data stream's attributes further include a volume of each gender which generated the conversations corresponding to the at least one topic.

28. A system which reveals correlations in data signals, the system comprising:
means for automatically importing a first data stream comprising a first time series of the data signals from conversations occurred within one or more social networks;
means for importing a second data stream comprising a second time series of the data signals from a user selected data source,
wherein each of the data streams includes a plurality of attributes which categorize a corresponding data stream's total volume;
means for, responsive to a selection of one or more attributes of a respective data stream, displaying, on a user interface, the data signals which correspond to the selected attributes using a time series plot;
means for determining correlations between the data streams based on calculating a correlation score for each correlation between (1) each selected attribute in the first data stream and (2) each selected attribute in the second data stream,
wherein the correlation score is calculated at least in part based on permutations of different lengths of time shifts in which the data signals take place; and
means for displaying, on the user interface, correlation scores adjacent to their respective attributes.

* * * * *

UNITED STATES PATENT AND TRADEMARK OFFICE
CERTIFICATE OF CORRECTION

| | | |
|---|---|---|
| PATENT NO. | : 8,762,302 B1 | Page 1 of 1 |
| APPLICATION NO. | : 14/185809 | |
| DATED | : June 24, 2014 | |
| INVENTOR(S) | : Spivack et al. | |

It is certified that error appears in the above-identified patent and that said Letters Patent is hereby corrected as shown below:

On the Title Page Item [56]

On page 2, in column 2, under "Other Publications", line 5, delete "Architecutre" and insert -- Architecture --, therefor.

On page 2, in column 2, under "Other Publications", line 24, delete "Schedulign" and insert -- Scheduling --, therefor.

In the Specification

Column 1, line 12, after "STREAMS"," insert -- Feb. 22, 2013, --.

Column 7, line 37, delete "Metatdata" and insert -- Metadata --, therefor.

Column 21, line 67, after "ads)" insert -- . --.

Column 23, line 48, delete "(e.g,)" and insert -- (e.g.,) --, therefor.

Column 24, line 5, after "etc.)" insert -- . --.

Column 24, line 17, after "elements)" insert -- . --.

Column 24, line 28, after "etc.)" insert -- . --.

Column 31, line 5, delete "an" and insert -- and --, therefor.

Column 33, line 23, after "services" insert -- . --.

Column 34, line 3, after "e-coupon" insert -- . --.

Column 34, line 37, after "sites" insert -- . --.

Signed and Sealed this
Tenth Day of February, 2015

Michelle K. Lee
*Deputy Director of the United States Patent and Trademark Office*